United States Patent
Baumann

(10) Patent No.: US 7,867,158 B2
(45) Date of Patent: Jan. 11, 2011

(54) DEVICE FOR SEPARATING IMPURITIES FROM THE LUBRICATING OIL OF AN INTERNAL COMBUSTION ENGINE

(75) Inventor: Dieter Baumann, Greven-Gimbte (DE)

(73) Assignee: Hengst GmbH & Co. KG, Munster (DE)

(*) Notice: Subject to any disclaimer, the term of this patent is extended or adjusted under 35 U.S.C. 154(b) by 1006 days.

(21) Appl. No.: 10/568,005

(22) PCT Filed: Aug. 11, 2004

(86) PCT No.: PCT/EP2004/008988

§ 371 (c)(1),
(2), (4) Date: Feb. 10, 2007

(87) PCT Pub. No.: WO2005/018775

PCT Pub. Date: Mar. 3, 2005

(65) Prior Publication Data

US 2007/0232475 A1 Oct. 4, 2007

(30) Foreign Application Priority Data

Aug. 13, 2003 (DE) .............................. 203 12 484 U

(51) Int. Cl.
*B04B 9/06* (2006.01)

(52) U.S. Cl. .............................. 494/36; 494/49; 494/64; 210/232

(58) Field of Classification Search .................. 494/24, 494/36, 43, 49, 64, 65, 67, 83, 84, 901, 5, 494/60; 210/168, 171, 232, 360.1, 380.1, 210/416.5; 184/6.24
See application file for complete search history.

(56) References Cited

U.S. PATENT DOCUMENTS

| | | | | |
|---|---|---|---|---|
| 4,165,032 A * | 8/1979 | Klingenberg | ................. | 494/49 |
| 4,615,315 A * | 10/1986 | Graham | .................. | 123/196 A |
| 5,603,829 A * | 2/1997 | Baumann | ..................... | 210/295 |
| 5,674,392 A * | 10/1997 | Christophe et al. | .......... | 210/298 |
| 7,497,887 B2 * | 3/2009 | Baumann | ................... | 55/385.3 |
| 2005/0236322 A1* | 10/2005 | Baumann | .................... | 210/435 |
| 2007/0232475 A1* | 10/2007 | Baumann | ..................... | 494/36 |

FOREIGN PATENT DOCUMENTS

| | | | |
|---|---|---|---|
| DE | 43 06 431 C1 | | 7/1994 |
| DE | 101 10 381 A 1 | | 9/2002 |
| DE | 10110381 A1 | * | 9/2002 |
| DE | 1 260 260 A 1 | | 11/2002 |
| EP | 1260260 A1 | * | 5/2002 |
| WO | WO2004/007052 A1 | | 1/2004 |
| WO | WO 2004007052 A1 | * | 1/2004 |
| WO | 2005/018775 A1 | * | 3/2005 |

* cited by examiner

*Primary Examiner*—Charles Cooley
(74) *Attorney, Agent, or Firm*—Greer, Burns & Crain, Ltd.

(57) ABSTRACT

The invention relates to a device for separating impurities from the lubricating oil of an internal combustion engine. The device comprises a filter insert on the bottom and a centrifuge thereabove that is provided with a rotor which is driven by means of penetrating lubricating oil. The filter insert and the centrifuge are disposed on top of each other in a common two piece housing that is closed during operation of the device and encompasses a removable top screw cap and a fixed bottom housing part. A removable intermediate lid is positioned between the filter insert and the centrifuge within the housing. The centrifuge, the intermediate lid, and the filter insert can be removed from the housing in the open state thereof. Furthermore, the screw cap and the intermediate lid of the device are provided with detachable connecting members which engage with each other and transmit axial tractive forces or axial tractive and compressive forces.

40 Claims, 11 Drawing Sheets

DEVICE FOR SEPARATING IMPURITIES FROM THE LUBRICATING OIL OF AN INTERNAL COMBUSTION ENGINE

BACKGROUND OF THE INVENTION

The present invention relates to a device for separating impurities from the lubricating oil of an internal combustion engine, said device comprising a filter element at its bottom and, on top of said filter element, a centrifuge with a rotor drivable by means of lubricating oil flowing therethrough, wherein said filter element and said centrifuge are arranged, one above the other, in a common two-piece housing that is closed during operation of the device and comprises a removable upper screw cap and a stationary lower housing part, wherein a removable intermediate cap is arranged in the housing between said filter element and said centrifuge, and wherein said centrifuge, said intermediate cap and said filter element can be removed from the housing while the latter is in its open state.

A device of the aforementioned type has been disclosed in DE 43 06 431 C1. If the screw cap, as a removable part of the housing of this known device, is rotated in its loosening rotational direction, then first only the screw cap moves, in its thread, away from the stationary part of the housing in an upward direction, whereas the centrifuge rotor arranged in the upper part of the housing remains in its position. After the housing cap has been removed, the rotor of the centrifuge is positioned in its lower bearing. Then the centrifuge rotor can be removed. Thereafter, the intermediate cap has become accessible. The intermediate cap must be pulled out of the lower part of the housing in an upward direction. Provided that detachable connection means are provided between the intermediate cap and the filter element, said intermediate cap takes along said filter element that is arranged below it, thus also removing it in an upward direction. After the combined unit consisting of intermediate cap and filter element has been removed, the filter element can, by canting or by exerting a tractive force in axial direction, be disengaged from and pulled out of the intermediate cap, while a new filter element can be inserted in the intermediate cap and brought in engagement therewith through the detachable connection means.

In relation to its disassembly, the device is then assembled in reverse order by first introducing the intermediate cap including filter element in the lower part of the housing. Thereafter, the centrifuge rotor is placed on the intermediate cap with its lower bearing. Finally, the screw cap is screwed on; therein, it must be ensured that the upper bearing of the centrifuge rotor assumes its desired position in the center of the upper internal end of the screw cap.

Obviously, disassembly and assembly of this known device are relatively complicated and troublesome. In addition, disassembly requires that oily parts, in particular the intermediate cap, be seized manually or with an appropriate tool. Apart from operating personnel getting their hands dirty, this poses the further problem that it is difficult to hold the intermediate cap sufficiently firmly because of its oily surface. As a result, it is even more difficult to pull out the intermediate cap from the lower part of the housing against the developing frictional forces and against a possibly present vacuum.

SUMMARY OF THE INVENTION

Therefore, the present invention aims at creating a device of the aforementioned type, which obviates the drawbacks described above and which particularly allows disassembly and assembly to be carried out in an easier, faster and cleanlier manner, especially in connection with the replacement of the filter element and/or the centrifuge rotor.

A solution to this problem is provided by the invention by means of a device of the aforementioned type, characterized in that the screw cap and the intermediate cap comprise detachable connection means or members that can be brought in engagement with each other and are intended to transmit axial tractive forces or axial tractive and compressive forces.

The invention is to advantage in that, when the screw cap is rotated in its loosening rotational direction, the intermediate cap and the centrifuge arranged therebetween, jointly with the screw cap, are also moved in relation to the stationary part of the filter housing and in an upward, that is in loosening direction. Once it has been completely rotated in its loosening rotational direction, the screw cap can, jointly with the intermediate cap and the centrifuge, be moved away from the housing, wherein the intermediate cap and the centrifuge are, at the same time, moved out of the housing. It is now no longer necessary to pull out the centrifuge rotor and the intermediate cap separately, a step that involves the drawbacks described above. Thereafter, the filter element is also accessible at the bottom of the housing. Since the connection means between the screw cap and the intermediate cap are detachable connection means, these two parts can, after having been jointly pulled out of the housing, be separated from each other, making the centrifuge rotor accessible. Vice versa, it is possible to form a pre-assembled unit comprising intermediate cap, rotor and screw cap, which can jointly be reconnected to the housing of the device in a single screwing operation. This facilitates and accelerates disassembly and assembly of the device, allowing operating personnel to work more cleanly. If the connection means are also designed to transmit axial compressive forces, they can be used to divert forces that are caused by differences in the pressure on either side of the intermediate cap and are acting on the latter in the direction towards the screw cap.

A further embodiment provides that, by rotating the screw cap in its loosening rotational direction in relation to the intermediate cap, the connection means can be brought in engagement with each other and, by rotating the screw cap in its tightening rotational direction in relation to the intermediate cap, can be brought out of engagement with each other. This embodiment is to advantage in that the connection means can be brought in and out of engagement by a simple rotary motion. Therein, engaging and disengaging practically do not require any effort as is necessary for a locking connection when the locking connection is to be established or undone. The engagement for transmission of tractive forces acting in axial direction is, to advantage, established only if it is actually required, that is when the device is being disassembled. This engagement is simply generated by rotating the screw cap in its loosening rotational direction, this being anyway necessary for unscrewing the screw cap from the stationary part of the housing. At the same time, this ensures that, when the screw cap is rotated in its loosening rotational direction, the intermediate cap also makes the movement of the screw cap away from the remaining housing in the manner desired. As a result, this device facilitates easy removal of the intermediate cap from the housing because the intermediate cap is taken along and out of the housing at the same time as the cap is removed, thus not having to be taken out of the housing separately by operating personnel. Again, a small rotary motion, now in the tightening rotational direction of the screw cap, suffices to separate the intermediate cap from the screw cap, whereby the connection means between the intermediate cap and the screw cap are disengaged and the intermediate cap is separated from the screw cap. For example, a used-up centrifuge rotor can, thereafter, be disposed of and can be replaced by a new rotor. Said intermediate cap can then be connected to the screw cap through the connection means in a likewise easy manner by a simple rotary motion and can then be inserted in the housing together with the rotor and the screw cap as a pre-assembled unit and fixed in its position in the housing by rotating the screw cap in its tightening rotational direction.

Furthermore, it is preferably provided that the connection means connecting the screw cap and the intermediate cap that are formed as rotary connection means are designed in the form of a bayonet lock or as a short-length thread. In any case, this allows to achieve an advantageously short rotational distance for connecting and disconnecting the screw and the intermediate cap, thus permitting work to be carried out speedily.

The invention further proposes that the intermediate cap has the shape of a bell and comprises at its outer perimeter axially extending ribs each of which is provided with at least one broadening or aperture pointing in circumferential direction and is designed as connection means and that the screw cap comprises at its lower edge hooks or noses that are pointing in its loosening rotational direction and are provided as connection means and can be brought in engagement with the broadenings or apertures by rotating the screw cap in its loosening rotational direction in relation to the intermediate cap and can be brought out of engagement by rotating the screw cap in its tightening rotational direction in relation to the intermediate cap. In this embodiment, the screw cap merely requires a plurality, for example three or four, hooks or noses that are distributed over the perimeter thereof and at the lower end edge thereof, this requiring only few additional steps during manufacture of the screw cap. On the side of the intermediate cap, the steps additionally required for the formation of the broadenings or apertures as connection means that are cooperating with the hooks or noses are likewise relatively few, so that the manufacture of the intermediate cap does not require any noticeable additional effort, that would increase the price of the device, either.

A further development provides that the ribs that comprise the broadenings or apertures are, at the same time, used as stabilization and force diverting ribs for reinforcing the intermediate cap and for diverting onto the screw cap such forces that are caused by an oil pressure below the intermediate cap in the interior region of the housing. As a result, the ribs assume two functions, thus minimizing the material and manufacturing expenditures required for achieving as many functions as possible.

The connection means of the intermediate cap can be arranged at any place differing from the region of ribs along the outer perimeter of the intermediate cap. In relation thereto, a further preferred embodiment provides that the intermediate cap has the shape of a bell and, in a radially outward direction, comprises at its upper side a plurality of axially extending wings that are pointing in upward direction and are spaced apart from each other in circumferential direction, wherein each of said wings is formed to have as connection means at least one broadening or aperture pointing in circumferential direction or one recess pointing in a radially inward direction and that, at its lower edge, the screw cap comprises as connection means hooks or noses extending in its loosening rotational direction or in a radially inward direction, wherein said hooks or noses can be brought in engagement with the connection means of the intermediate cap by rotating the screw cap in its loosening rotational direction in relation to the intermediate cap and can be brought out of engagement with the connection means of the intermediate cap by rotating the screw cap in its tightening rotational direction in relation to the intermediate cap. This embodiment is to particular advantage in that the connection means at the intermediate cap are arranged at a place that is as far at the top of the upper region thereof as possible, thus permitting use of an advantageously low screw cap.

In order to prevent the connections means of the screw cap and the intermediate cap from positioning in front of each other and jamming in axial direction while the screw cap is rotated in its tightening rotational direction after the intermediate cap has been inserted beforehand, it is provided that the connection means of the screw cap on the one hand and the wings with the connection means of the intermediate cap on the other hand are arranged and designed such that, with the intermediate cap being already inserted in the housing, they overlap each other in axial direction when the screw cap is placed onto the stationary part of the housing before the thread engagement thereof.

To allow easy and quick mounting of the device, it is, as has already been mentioned above, appropriate that the parts of the device can be joined to form pre-assembled units. To facilitate this joining, it is provided that the wings comprise, at their radially outer end, a guide contour fitting in the interior region of the screw cap with motional play. This guide contour ensures that the intermediate cap, including the centrifuge rotor it carries, can be aligned in an exactly axial direction when being inserted in the screw cap, wherein it is ensured that an upper shaft end of a rotor shaft is positioned precisely in a shaft holding in the center of the upper inner side of the screw cap.

During operation of the device, a considerable lubricating oil pressure is present below the intermediate cap, whereas the region above the intermediate cap is pressureless. In order to absorb the forces caused by the pressure difference and acting on the intermediate cap and to divert said forces into the screw cap, it is provided to provide a step at or next to each of the wings, said step projecting in a radially outward direction and forming the basis on which a section of the lower edge of the screw cap is supported when the latter is in its tightened state.

In order to lock the intermediate cap in circumferential direction against undesired rotary motions when the device is in its assembled state, the invention proposes that each of the steps, at least in part, comprise an edge projecting in upward direction at its end pointing in the loosening rotational direction of the screw cap. In the assembled state, said edges form a stop preventing the intermediate cap from rotating in relation to the screw cap in a self-acting manner, wherein said stop can, however, easily be overcome by manually rotating the screw cap in its loosening rotational direction.

In order to ensure that the lower edge of the screw cap will be reliably supported on the steps while the screw cap is rotated in its tightening rotational direction, particularly when said lower edge fails to comprise a continuous and steady contour, a continuous or broken sliding ramp is provided for the lower edge of the screw cap, said sliding ramp being arranged at the same level as said edge and, as seen in the tightening rotational direction of the screw cap, in front of each of the steps at the intermediate cap that comprise at least one edge.

In order to increase the overall stability and load carrying capacity of the wings and the intermediate cap, it is proposed that the wings are connected to each other via a continuous circumferential collar or are joined to form a continuous circumferential collar.

In order to ensure that, with the screw cap unscrewed from the stationary housing part, the intermediate cap connected to the screw cap through the connection means that are now in engagement and the centrifuge rotor connected to the intermediate cap do not fall off in an undesired self-acting manner and might be damaged thereby, it is furthermore, preferrably, provided that the connection means at the screw cap on the one hand and/or the connection means at the intermediate cap on the other hand are formed to have a slope or step at their surfaces engaging each other, said slope or step securing the engaged position. This creates a sufficiently efficient anti-loosening device which can, however, easily be overcome manually.

Since the screw cap must, on the one hand, absorb forces from and exert forces on the intermediate cap and, on the other hand, have a weight that is as light as possible, it is furthermore proposed that the screw cap is formed to have strengthening ribs at its inner perimeter, at least in the region of its connection means. Therein, said ribs preferrably extend in axial direction of the cap, according to the main line of action.

In a first version of the aforementioned device, the intermediate cap and the filter element, as seen in relation to each other, are non-connected component parts of the device and the intermediate cap and/or the filter element are/is designed without any connection means. After the screw cap has been removed together with the centrifuge and the intermediate cap, the filter element can, here, subsequently be taken out of the housing separately; this can, for example, be achieved manually or by using an appropriate handling tool.

In order to also incorporate the filter element in the assembly unit that can be jointly removed from the housing, it is alternatively proposed that the intermediate cap and the filter element comprise detachable second connection means for the transmission of axial tractive forces that can be brought in engagement with each other. This permits operating personnel to seize and rotate only the screw cap that is usually clean on its outside; pulling out of the oily further parts of the device does not require that said parts be seized to remove them from the housing. Rather, the screw cap, when moving in an upward direction, also takes along the filter element, in addition to the centrifuge and the intermediate cap, in the same upward movement direction. The unit comprising screw cap, centrifuge, intermediate cap and filter element that has been taken out of the housing can then be disassembled in an easy manner and, after replacement of the centrifuge rotor and/or the filter element, be re-assembled and jointly installed in the housing.

In a first embodiment, the second connection means can be designed as locking connection means. These connection means as such are known from a connection between a filter element and a screw cap of a filter housing and can be used here as well. Therein, conventional filter elements that are already provided with locking connection means can, to advantage, also be used in the device according to the invention.

A concrete further development provides that the second connection means are, on the side of the filter element, formed by a circle of locking hooks with locking noses extending in a radially outward or inward direction and, on the side of the intermediate cap, by a ring undercut at its inner perimeter or at its outer perimeter.

As an alternative, the second connection means can be designed as rotary connection means in the stead of locking connection means. These rotary connection means are to particular advantage in that only a rotary motion requiring very low forces must be exerted to establish and undo the connection, this also being possible manually without any difficulties.

In a further embodiment, it is provided that the second connection means that are designed as rotary connection means are designed in the form of a bayonet lock or as a short-length thread. In this manner, an advantageously short rotational distance is also achieved for connecting and disconnecting the intermediate cap and the filter element, this also facilitating work to be carried out speedily.

In order to be able to also use current filter elements already provided with known connection means in the device according to the invention even in that of its embodiments that is equipped with rotary connection means between the intermediate cap and the filter element, a further embodiment of the device proposes that the connection means on the side of the filter element are formed by a concentric circle of snap-on hooks that is present at an upper end disk of the filter element and that the associated connection means of the intermediate cap are formed by a ring with cam segments that is concentrically arranged at the bottom side of the upper part of said intermediate cap, wherein, in a first rotational position that can be adjusted by rotating in tightening rotational direction, the circle of snap-on hooks can be moved in axial direction into the ring and out of the ring with the cam segments in relation to each other and wherein, in a second rotational position that can be adjusted by rotating in loosening rotational direction, the circle of snap-on hooks that has been moved into the ring cannot be moved out of the ring with the cam segments in axial direction in relation to each other. In this embodiment of the device, it is only necessary to modify and adjust the inner side of the screw cap; thereafter, the rotary connection between the intermediate cap on the one hand and the filter element on the other hand can be established and undone in a manner according to the invention. As compared with the formerly usual filter elements, it is not necessary to make any modifications to the filter element, so that conversion to the new type of connection can be achieved with very little technical effort. Both the first and the second connection means are, to advantage, brought in engagement with each other by rotating the screw cap in its loosening rotational direction. Thus, while the screw cap is unscrewed from the stationary part of the housing and on completion of that unscrewing operation, the screw cap engages the intermediate cap and the intermediate cap engages the filter element in a desired and inevitable manner. The unit comprising screw cap, centrifuge, intermediate cap and filter element that has been removed from the housing can then be separated easily by rotating it in opposite rotational direction in relation to each other, because this opposite rotation now undoes the engagement between the connection means, disengaging the screw cap from the intermediate cap and disengaging the intermediate cap from the filter element. After these connection engagements have been undone, all parts of the device that have been removed from the stationary housing part, that are the filter element, the intermediate cap, the centrifuge rotor and the screw cap, can be separated from each other. After the filter element and/or the centrifuge rotor have/has been replaced by new components, assembly is then achieved in reverse order and with opposite rotational directions. Thereafter, a new pre-assembled unit comprising screw cap, centrifuge, intermediate cap and filter element is provided, which can, as a unit, be inserted in the lower part of the housing and connected to the remaining housing by rotating the screw cap. Rotation of the screw cap in its tightening rotational direction causes the previously established connection engagements to be disengaged, because said connection engagements are neither required when the screw cap is rotated in its tightening rotational direction nor when the screw cap is in its tightened state.

A first associated further development proposes that the ring is formed integrally with the intermediate cap. This prevents assembly work inside the intermediate cap during manufacture of the latter.

A second alternative associated further development proposes that the ring is inserted in the intermediate cap as a separate component such that it can neither be rotated nor lost. Here, the cap can initially be manufactured with a relatively simple design with one recess. Thereafter, the ring can be installed in this recess, wherein mutual welding or glueing or locking is possible to ensure that the two parts are connected to each other such that they can neither be rotated nor lost. Furthermore, the ring on the one hand and the intermediate cap on the other hand can be produced from different materials, wherein it is possible to select a material with properties that are especially suitable for the particular tasks.

Furthermore, the device preferably provides that the screw cap, the intermediate cap, an upper end disk of the filter element and/or the ring with the cam segments that is designed as a separate component are each single-piece injection-molded parts of plastic. This permits cost-efficient bulk production and results in a low weight of the device.

As an alternative, the screw cap, the intermediate cap and/or the ring with the cam segments that is designed as a separate component can each be single-piece die castings of light metal. This also permits cost-efficient bulk production, wherein the parts have a higher weight but, at the same time, also a higher strength and heat resistance.

It is also possible to produce the various parts of the device from different materials in a mixed design.

In a further embodiment of the device, it is provided according to the invention
   that the device is designed with a broken centrifuge bottom that forms a part of the intermediate cap and permits lubricating oil coming out of the rotor to flow therethrough,
   that the centrifuge bottom comprises in its center a holding for a lower pivot bearing or a lower axle end of the rotor, and
   that the centrifuge bottom is designed at its outer perimeter and at least in its upper part with an annular external thread that can be screwed into a mating internal thread in the interior region of the upper housing part.

This embodiment of the device is likewise to advantage in that, while the screw cap is rotated in its loosening rotational direction, the intermediate cap and the intermediately positioned centrifuge together with the screw cap are, at the same time, moved in an upward direction in relation to the stationary part of the filter housing. Once it has been completely rotated in its loosening rotational direction, the screw cap can, jointly with the intermediate cap and the centrifuge, be moved away from the housing, wherein the intermediate cap and the centrifuge are, at the same time, moved out of the housing. Here as well, it is no longer necessary to pull out the centrifuge rotor and the intermediate cap separately, a step that involves the drawbacks described above. Thereafter, the filter element is also accessible at the bottom of the housing. Since the connection means between the screw cap and the intermediate cap are formed by a threaded connection which can be undone easily, these two parts can, after having been jointly pulled out of the housing, be separated from each other by being unscrewed, making the centrifuge rotor accessible. Vice versa, it is possible to form a pre-assembled unit comprising intermediate cap, rotor and screw cap, which can jointly be reconnected to the housing of the device in a single screwing operation. This facilitates and accelerates disassembly and assembly of the device in this embodiment as well, allowing operating personnel to work more cleanly. At the same time, this embodiment of the device is to advantage in that a higher accuracy of the positional tolerance is achieved for the rotational axis of the rotor of the centrifuge. Here, this increased accuracy of the positional tolerance must, in particular, be attributed to the fact that there is only one interface between the various components, which defines the accuracy of the positional tolerance, that is the interface between the removable screw cap and the centrifuge bottom of the centrifuge. The centrifuge bottom can be screwed into the screw cap, with the result that the only dimensional tolerances that may occur as a source of positional variations of the rotary axis of the centrifuge rotor are those of the two threads of the centrifuge bottom and the screw cap. This device, thus, comprises at least one such interface less than devices according to the state of the art, so that an appropriately increased accuracy of the position and the course of the rotary axis of the centrifuge rotor is achieved. This increased accuracy ensures that the centrifuge rotor is running with very low friction, so that the drive power applied by the propulsion nozzles of the rotor can, for the greatest part, be used for the rotation of the centrifuge rotor and is not wasted by bearing friction. In this manner, a high efficiency of the centrifuge is ensured without having to increase the throughput through the centrifuge.

In a further embodiment of this device, the centrifuge bottom and the intermediate cap can be formed integrally with each other. This executive form particularly achieves simplified and accelerated assembly of the device. This is faced by a component combining the centrifuge bottom and the intermediate cap, which is relatively complex and, therefore, requires slightly more manufacturing steps.

As an alternative, the centrifuge bottom and the intermediate cap can each be formed as a separate component which can be brought in an axially extending and sealing plug or screwed connection which transmits axial tractive forces or axial tractive and compressive forces. This connection can be established either directly or by means of an inserted intermediate piece. Owing to their form which is less complex in this executive form, the various components can be manufactured more easily, but assembly of the device requires an additional assembly step.

The executive form where the centrifuge bottom and the intermediate cap are each designed as a separate component further provides that an adapter piece that is hollow in its axial direction and serves as an intermediate piece is inserted between the centrifuge bottom and the intermediate cap, the lower part of said adapter piece centrally engaging the intermediate cap and the upper part of said adapter piece centrally engaging the centrifuge bottom, wherein the outer perimeter of the adapter piece has a spherical contour in its upper and/or lower part, permitting rotation of the adapter piece in relation to the axial direction to a limited extent. The adapter piece transmits axial tractive forces and forms a balancing element capable of compensating both a rotation and a lateral offset of the central axis of the intermediate cap and the central axis of the centrifuge in relation to each other. This design of the device also always ensures smooth running of the rotor of the centrifuge, so that the driving force of the rotor can be used to generate the rotation as desired and is used to overcome the bearing friction to a minor part only. This ensures a high efficiency of the centrifuge, although the various components of the device produce certain manufacturing and assembly tolerances. If the adapter piece has a spherical contour in its upper part only, rotation is only possible in relation to the axial direction of the centrifuge; in this executive form, the lower bearing of the centrifuge is then, appropriately, designed with a certain flexibility, as is, for example, described in the document DE 199 11 212 A1 cited above. If the adapter piece has a spherical contour both in its upper and lower parts, it can be rotated both in relation to the axial direction of the filter element and in relation to the axial direction of the centrifuge, so that the adapter piece alone suffices to compensate all directional deviations and all directional offsets. In this case, the lower rotor bearing of the centrifuge does not have to comprise any flexibility and can be designed in an accordingly simpler manner.

A further development of the device equipped with the adapter piece provides that the adapter piece comprises at its outer perimeter a projecting band or collar between its lower part and its upper part. This band or collar is, in particular, intended to fix a provided mounting position of the adapter piece, so that special means to fix the adapter piece in its desired position are not necessary.

It is furthermore provided for the adapter piece that it comprises in its lower part a plurality of axially extending flexible locking arms with locking noses which permit engaging insertion of the adapter piece in an oil through opening in the intermediate cap. Owing to the locking arms provided with locking noses, the adapter piece can be mounted to the intermediate cap very easily, since it must merely be plugged in. After it has been plugged in, the adapter piece is fixed in the intermediate cap in a manner that is sufficiently reliable.

Furthermore, it is preferably provided that, to permit connection of the screw cap and the lower housing part to each other in a detachable manner, the screw cap is designed with an external thread and the lower housing part with a mating internal thread or the screw cap with an internal thread and the lower housing part with a mating external thread. If the screw cap is provided with an external thread, the inner perimeter of the screw cap remains free for arranging the internal thread for screwing to the centrifuge bottom. If the screw cap is provided with an internal thread for connecting the screw cap to the lower housing part in a detachable manner, this internal thread is, appropriately, positioned at the bottommost point of the screw cap; a further internal thread, which is smaller in diameter, can then be arranged thereabove for screwing to the centrifuge bottom.

To ensure adequate stability and load carrying capacity of the centrifuge bottom on the one hand and to prevent the centrifuge bottom from obstructing drainage of the lubricating oil flowing out of the centrifuge rotor on the other hand, the centrifuge bottom preferably comprises a plurality of arms that are extending in radial direction from the holding to its outer perimeter comprising the external thread provided there and that are spaced apart from each other in circumferential direction.

In a further embodiment, the arms are preferably flat, with their flat planes each being arranged in radial and axial direction.

Since the intermediate cap separates the space accommodating the filter element within the housing from the space of the filter housing accommodating the centrifuge and since the pressure conditions of the lubricating oil differ in these two spaces, a reliable seal of the two spaces of the housing must be ensured by the intermediate cap. To ensure this seal, the intermediate cap is, appropriately, plugged in the lower part of the housing with an intermediate layer of a radially and/or axially acting seal being placed therebetween. Appropriately, the seal should be arranged and designed such that the higher pressure of the lubricating oil present in the lower housing part in the region of the filter element promotes and intensifies the sealing effect of the seal. At the same time, however, assembly remains easy because the intermediate cap is simply plugged in the lower part of the housing.

To fix the intermediate cap in a desired position in the axial direction of the device, it is furthermore provided that, with the housing closed, the intermediate cap is, at its outer perimeter, supported in axial direction on the upper side of a step in the inner perimeter of the lower housing part. This ensures the desired fixed position of the intermediate cap in axial and downward direction with simple means, but in a highly reliable manner. The fixed position of the intermediate cap in axial and upward direction is ensured by the screw cap in its tightened position.

Owing to the embodiment of the device illustrated above, the centrifuge, the centrifuge bottom, the intermediate cap and the screw cap can, to advantage, form a pre-assembled unit which can be screwed to the lower housing part. As a result, it is, to advantage, possible that this pre-assembly is, for example, already carried out by a supplier who can also separately test the pre-assembled unit including the centrifuge at this early stage. In a further assembly step, it is then only necessary to insert the filter element in the lower part of the housing, to insert the intermediate cap if required, and then to screw the pre-assembled unit to the lower housing part. Herein, it is possible to even include the filter element in the pre-assembled unit, provided the appropriate detachable connection means are available between the intermediate cap and the filter element.

An embodiment of the device provides that the screwed connection between the screw cap and the stationary housing part and the screwed connection between the screw cap and the centrifuge bottom comprise equidirectional threads. Therein, both threads can either be right-hand threads or left-hand threads, wherein right-hand threads are preferred because of the usual directions for unscrewing and screwing.

As an alternative, the screwed connection between the screw cap and the stationary housing part and the screwed connection between the screw cap and the centrifuge bottom can comprise threads of opposite sense. This particularly ensures that, while the screw cap is removed from the stationary housing part by being rotated in its loosening rotational direction, the screwed connection between the screw cap and the centrifuge bottom is prevented from coming loose unintentionally; on the contrary, said screwed connection is at best tightened, so that the intermediate cap, at any rate, remains connected to the screw cap as desired, while the latter is rotated in its loosening rotational direction.

A further optional measure to ensure the intended coherence of the component parts in the manner desired is a screwed connection between the screw cap and the centrifuge bottom that has a loosening torque exceeding the loosening torque of the screwed connection between the screw cap and the stationary housing part.

A further measure serving the same purpose is a screwed connection between the screw cap and the centrifuge bottom that has a loosening torque exceeding the loosening torque between the intermediate cap and the stationary housing part.

In addition or as an alternative, a detachable anti-loosening device can be provided at least for the screwed connection between the screw cap and the centrifuge bottom. This anti-loosening device can, for example, be a lock ring or a self-locking screw or a locking pin engaging the threaded connection.

In the executive form of the device that comprises the centrifuge bottom, the intermediate cap and the filter element, as seen in relation to each other, are, in a first version, also non-connected component parts of the device and the intermediate cap and/or the filter element are/is designed without any connection means. After the screw cap has been removed together with the centrifuge, the centrifuge bottom and the intermediate cap, the filter element can, here, subsequently be taken out of the housing separately; this can, for example, be achieved manually or by using an appropriate handling tool.

As an alternative to the version mentioned above, the intermediate cap and the filter element can comprise detachable second connection means for the transmission of axial tractive forces that can be brought in engagement with each other. In this manner, the filter element is also taken out of the housing along with the screw cap while the latter is rotated in its loosening rotational direction and can then be separated from the intermediate cap and replaced by a new filter element outside of the housing. Installation as a unit will then be achieved in reverse order, so that insertion of the new filter element can be achieved in a likewise easy manner.

This detachable connection between the intermediate cap and the filter element can be designed in various ways; a first further development proposes that these second connection means are designed as locking connection means.

According to an alternative second further development, the second connection means can be designed as screwed connection or bayonet-type connection or rotary connection.

As regards further details, the aforementioned second connection means can be designed as has already been illustrated above in connection with the executive form of the device without any centrifuge bottom (Claims 3 to 25).

In order to be able to manufacture the device equipped with the centrifuge bottom as easily and cost-efficiently as possible and in high piece numbers and with a low weight, it is proposed that the housing, the centrifuge bottom, the intermediate cap and the adapter piece are plastic or light metal parts manufactured in an injection-molding process.

BRIEF DESCRIPTION OF THE DRAWING

Exemplary embodiments of the invention will be illustrated below by means of a drawing, in which.

DETAILED DESCRIPTION OF THE PREFERRED EMBODIMENT

Figure 1:
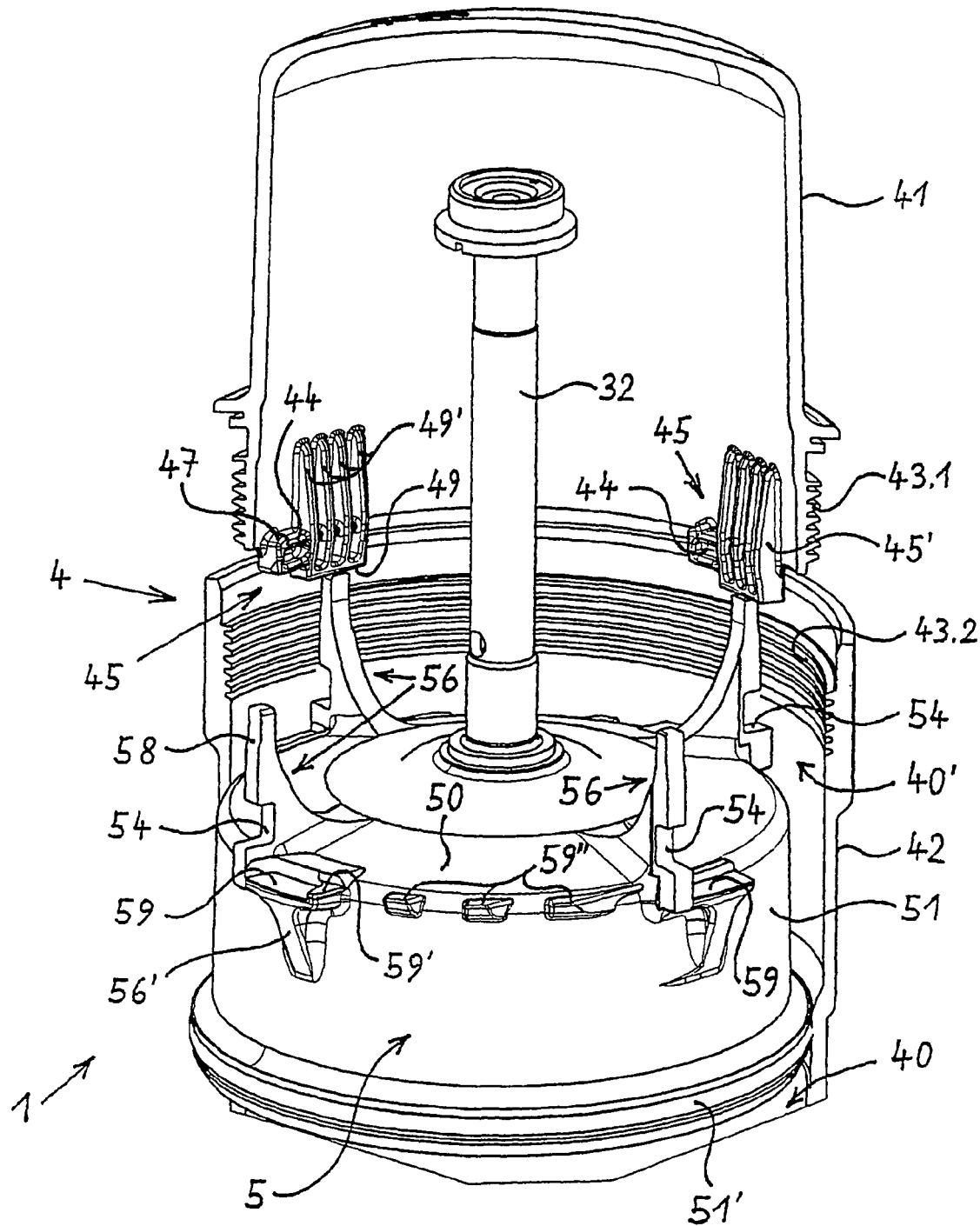
FIG. 1 is a partial view showing a breakaway illustration of a first device for separating impurities from the lubricating oil of an internal combustion engine, comprising an intermediate cap previously inserted in the housing of a device and comprising a screw cap that is still loose, in perspective.

As shown in FIG. 1 of the drawing, the represented first exemplary embodiment of the device 1 for separating impurities from the lubricating oil of an internal combustion engine comprises a housing 4 that is formed by a lower stationary housing part 42 and an upper screw cap 41. The screw cap 41 can be screwed into the stationary housing part 42 by means of a threaded connection 43.1, 43.2 that is sealed by a sealing ring, wherein the screw cap 41 is shown in FIG. 1 in a state where it has been rotated and loosened completely.

A filter element 2 that is not shown here (cf. FIG. 3) is arranged in a lower part of the housing 4. A centrifuge 3 (cf. FIG. 3), only one rotor axle 32 of which is shown here for reasons of clarity, is provided flush with the filter element 2 in the upper part of the housing 4 above said filter element 2, wherein a centrifuge rotor can be pivoted onto said rotor axle 32.

The interior region of the housing 4 is subdivided in a lower region 40 and an upper region 40' by a bell-shaped intermediate cap 5. The intermediate cap 5 comprises an upper part 50 that is arranged above the filter element and below the rotor 31 of the centrifuge 3. A circumferential wall 51 extends in downward direction from the radially outer edge of the upper part 50 of the intermediate cap 5. At its lower end, said circumferential wall 51 is inserted in the stationary part of the housing 42 in a sealing manner by means of a sealing ring 51'.

During operation of the device 1, the pressure present below the intermediate cap 5 is the operating oil pressure; above the intermediate cap 5, there is a pressureless region 40' for draining the oil exiting out of the centrifuge rotor, wherein the region 40' is usually connected to an oil pan of the associated internal combustion engine.

The lower end of the rotor axle 32 is held centrally in the upper side of the upper part 50 of the intermediate cap 5. The upper end of the rotor axle 32 is mounted centrally in the upper end region of the inner side of the screw cap 41.

Connection means or members 45, 54 are provided between the lower end of the screw cap 41 and the outer perimeter of the intermediate cap 5. On the side of the screw cap 41, the connection means 45 are formed by hooks 44 extending in circumferential direction and in the loosening rotational direction of said screw cap 41, said hooks 44 being integrally formed to fit to the lower edge of the screw cap 41. On the side of the intermediate cap 5, axially extending wings 56 comprising apertures 54 at their radially outward side are integrally formed on the outside of the circumferential wall 51 of said intermediate cap 5. Therein, the apertures 54 and the hooks 44 form the connection means which either engage or disengage each other, depending on the rotational state of the screw cap 41 and the intermediate cap 5 in relation to each other.

Strengthening ribs 49' are integrally formed to fit to the screw cap 41, immediately next to the connection means 45 of the screw cap 41 as seen in tightening rotational direction. As seen in the loosening rotational direction of the cap 41, said ribs 49' change into the hooks 44. On the side 45' of the ribs 49' that is pointing in tightening rotational direction, the arrangement of said ribs 49' forms a smooth vertically extending surface.

As can be distinctly seen from the lower region of the loosened screw cap 41 shown in FIG. 1, the connection means 45 project a little in downward direction, with the result that, here, the lower edge 49 of the screw cap 41 is positioned at a somewhat lower level than the lower edge of the thread 43.1 at the screw cap 41. At the same time, the connection means 45 at the screw cap 41 and the wings 56 at the intermediate cap 45 are arranged and formed such that, with the intermediate cap 5 already inserted in the housing 4, they overlap each other in axial direction if the screw cap 41 gets seated on the stationary housing part 42 before their threads engage each other. This reliably prevents the lower edge 49 from seating on the upper end of the wings 56 from above as seen in axial direction, while the screw cap 41 is being rotated in its tightening rotational direction, so that any cantings caused thereby when the screw cap 41 is rotated in its tightening rotational direction are also prevented. On the contrary, the threads 43.1, 43.2 can engage only when the connection means 45 are positioned between two neighboring wings 56 of the screw cap 5, as seen in circumferential direction.

Figure 2:
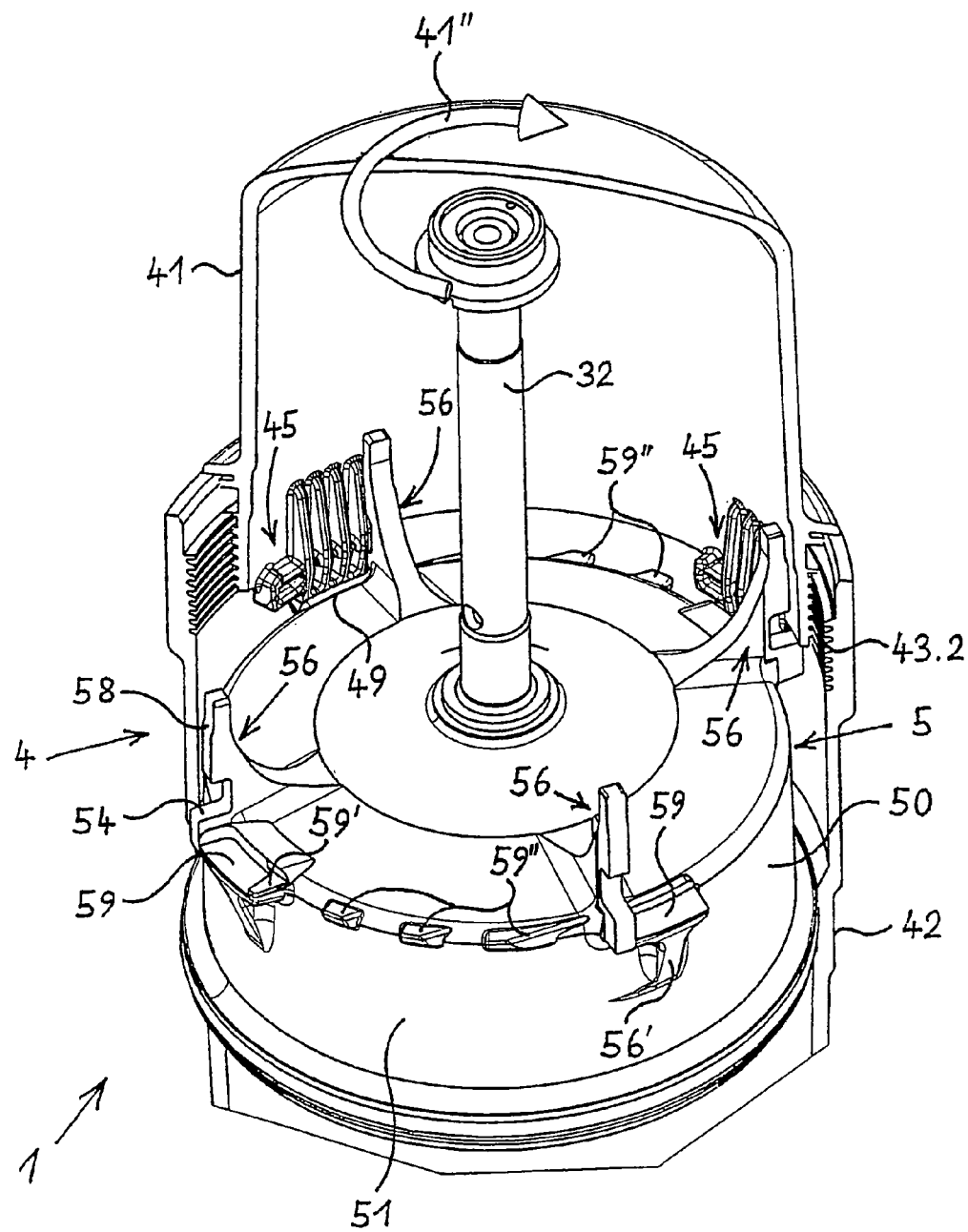
FIG. 2 is a view of the device of FIG. 1 in a state where the screw cap is tightened, in the same type of illustration as in FIG. 1.

FIG. 2 shows the device 1 in a state where the screw cap 41 is securely screwed to the stationary part 42 of the housing 4. This position is achieved by rotating the screw cap 41 in its tightening rotational direction 41''. While the screw cap 41 is rotated in its tightening rotational direction, the smooth side 45' of each of the rib arrangements 49' bears against the wings 56 in circumferential direction. In this position, the connection means 45, 54 are disengaged because, while the screw cap 41 is rotated in its tightening rotational direction, these connection means 45, 54 have been rotated in relation to each other such that there will be no engagement or that an initially present engagement will be undone. In this state, the connection means 45, 54 cannot transmit any forces in axial direction, this anyway neither being necessary for assembling the device 1 nor in the latter's assembled state.

With the device 1 in the assembled state, the screw cap 41 is seated with its lower edge 49 on steps 59 which are integrally formed to fit to the intermediate cap 5 immediately next to the wings 56 as seen in loosening rotational direction and project in a radially outward direction from said intermediate cap 5. Of the four steps 59 in the illustrated instance, two opposite steps are provided with a small edge 59' at their end pointing in loosening rotational direction, said edge 59' projecting in upward direction and serving as an anti-rotational device protecting the intermediate cap 5 against rotating in a self-acting manner in the assembled state. To prevent the screw cap 41 from adhering to the edges 59' while it is tightened, a sliding ramp 59'' is formed to fit to the intermediate cap 5 in front of each step 59 comprising an edge 59'. Here, the sliding ramps 59'' each consist of three ramp sections which are, however, spaced apart from each other by a distance that is less than the length of the lower edge 49 of the screw 41 below its ribs 49', as measured in circumferential direction.

Below each step 59, a rib 56' strengthening the step 59 is integrally formed to the intermediate cap 5 for stability reasons. Other than illustrated, the connection means 54 on the side of the intermediate cap 5 can, alternatively, also be provided in or at these ribs 56'.

Figure 3:
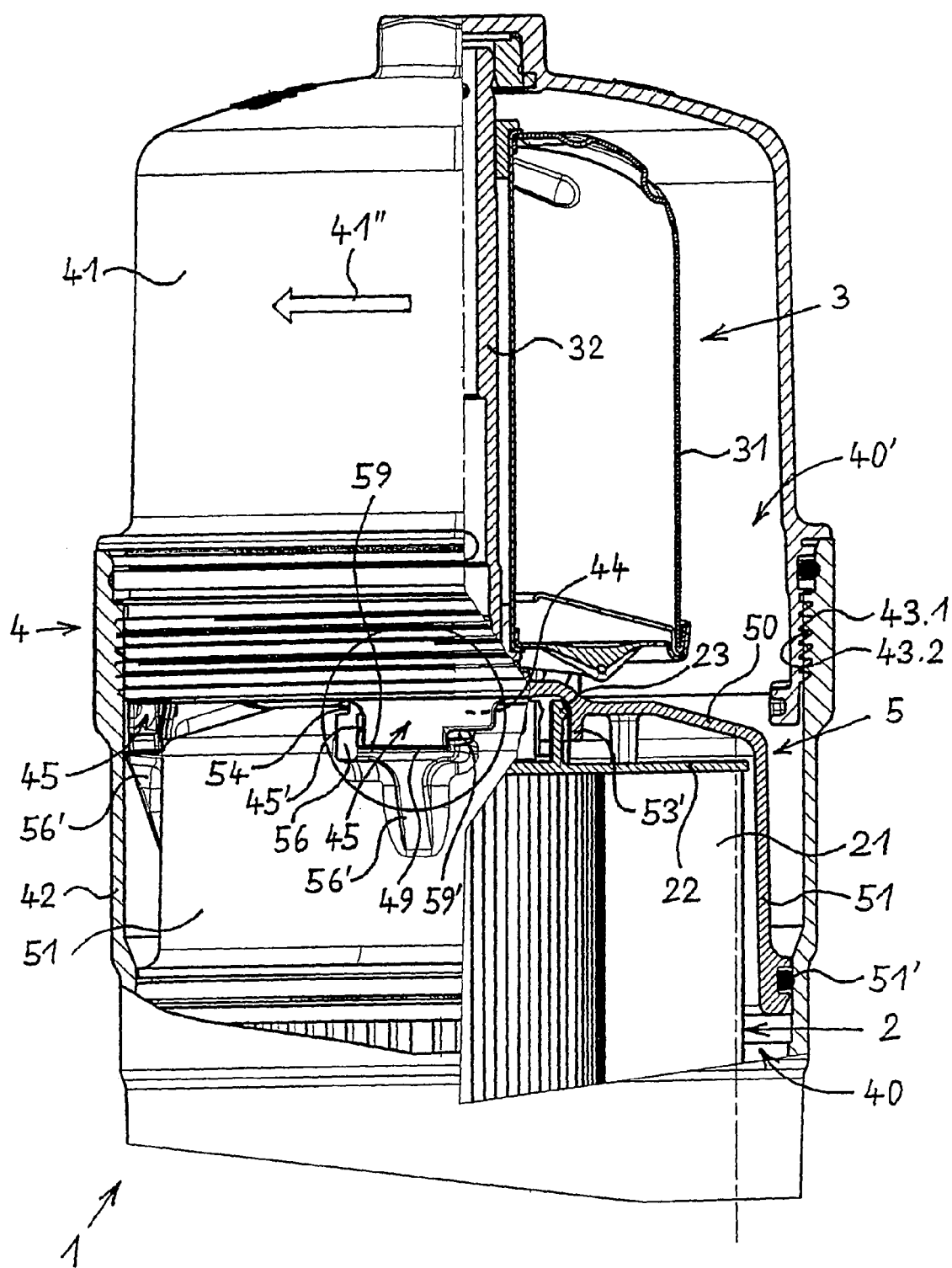
FIG. 3 is a partially lateral view, a partially vertical sectional view and a partially broken view of the device of FIG. 2 with tightened screw cap.

FIG. 3 is a particular clear view of the arrangement of the centrifuge 3 at the top and the filter element 2 at the bottom of the housing 4. The housing 4 is designed with the stationary lower housing part 42 and the detachable screw cap 41 connected thereto via the threads 43.1, 43.2. The intermediate cap 5 subdivides the interior region of the housing 4 in the lower housing region 40 accommodating the filter element 2 and the upper housing part 40' accommodating the centrifuge 3. The bell-shaped intermediate cap 5 with its curved upper part 50 and its circumferential region 51 adjacent thereto in downward direction is, in part, shown in perspective and, in part, in a sectional view. At the bottom of this circumferential region 51, the sealing ring 51' is inserted in its groove that points in a radially outward direction, with the result that the intermediate cap 5 is positioned in the lower part 42 of the housing 4 in a sealing manner.

In the illustrated instance, a centering ring 53' that is formed integrally with the intermediate cap 5 is arranged at the bottom side of the upper part 50 of the intermediate cap 5. The centering ring 53' cooperates with a circle 23 of locking hooks, as they are comprised in numerous current filter element, on the upper side of the upper end disk 22 of the filter element 2, thus centering the filter element 2 without axial tractive forces being transmitted by means of the circle 23 and the centering ring 53'; parts 23 and 53' are, here, designed as mere centering parts.

The centrifuge 3 comprises a centrifuge rotor 31 that is pivoted onto the rotor axle 32. With its lower end, said rotor axle 32 is seated in an appropriate central recess in the upper side of the intermediate cap 5. With its upper end, the rotor axle 32 is seated in an appropriate central recess at the inner side of the screw cap 41.

Furthermore, connection means 45, 54 that can optionally be engaged and disengaged by rotating the screw cap 41 are provided between the screw cap 41 and the intermediate cap 5 here as well. In the state of the device 1 shown in FIG. 3, where the screw cap 41 is completely and securely tightened, the connection means 45, 54 are disengaged.

During operation of the device 1, lubricating oil to be purified flows through an inlet that is not visible, first into the lower housing region 40 and, from there, from without inward in a radial direction through the filter medium body 21. A part of the lubricating oil that has flown through this filter medium body 21 flows up and into the centrifuge 3 and, after having left the centrifuge rotor 31, from there into the upper housing region 40'. This housing region 40' is pressureless and connected to the oil pan of an associated internal combustion engine via a return line that is not shown here.

Contrary to the upper housing region 40', the full oil pressure is present in the housing region 40 below the screw cap 5. In order to absorb and divert the force that is generated by this pressure difference and acts on the intermediate cap 5 in an axially upward direction, the intermediate cap 5 comprises outwardly projecting steps 59 in a radially outward region at its upper part 50. When it is in its tightened state, the screw cap 41 rests on said steps 59 with its lower edge 49. As a result, the intermediate cap 5 is secured in its position and can absorb the force caused by the pressure difference and divert it to the screw cap 41 without any difficulties. From there, the forces acting in an axially upward direction are diverted over a large area to the stationary part 42 of the housing 4 via the threaded connection 43.1, 43.2.

Figure 3A:
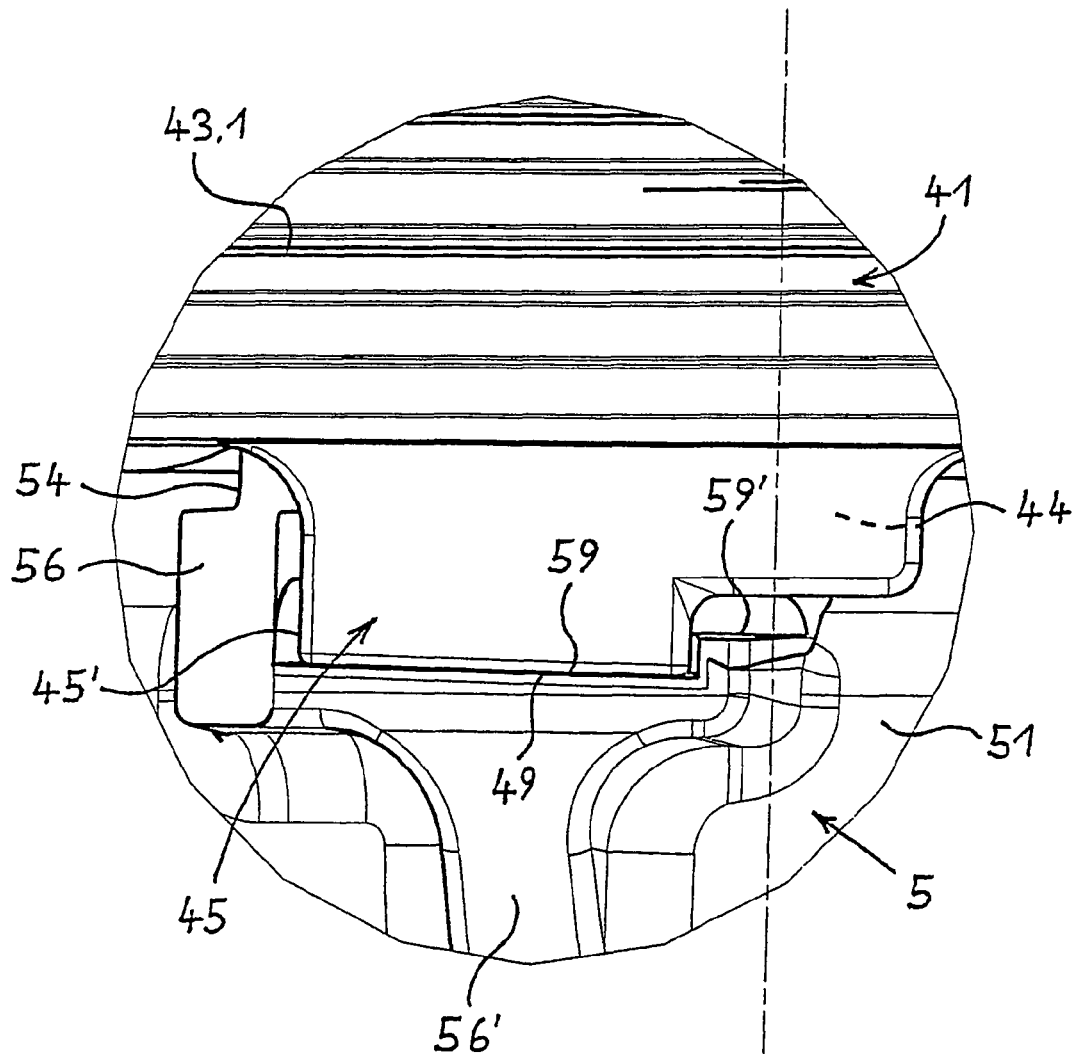
FIG. 3*a* is an enlarged view of the detail encircled in FIG. 3.

FIG. 3a is an enlarged illustration of the detail encircled in FIG. 3, showing the disengaged connection means 45, 54. To the outer left, the lower part of one of the wings 56 with the recess forming the connection means 54 can be seen, the major part of said recess being covered by the screw cap 41. Positioned to the right thereof is one of the connection means 45 of the screw cap 41, said connection means 45 bearing against the neighboring wing 56 with its smooth side 45', that is without engagement. Pointing to the right, the hook 44 of the connection means 45 is arranged at the inner perimeter of the screw cap 41 at a covered position.

The lower edge 49 of the screw cap 41 rests on the step 59 of the intermediate cap 5. The raised edge 59' at the right-hand end of the step 59 prevents the intermediate cap 5 from making automatic undesired rotary motions in relation to the tightened screw cap 41.

In its upper part, FIG. 3a discloses a small part of the screw cap 41 with its thread 43.1. At the bottom of FIG. 3a, a section of one of the ribs 56' on the outside of the circumferential wall 51 of the intermediate cap 5 is visible below the step 59.

Figure 4:
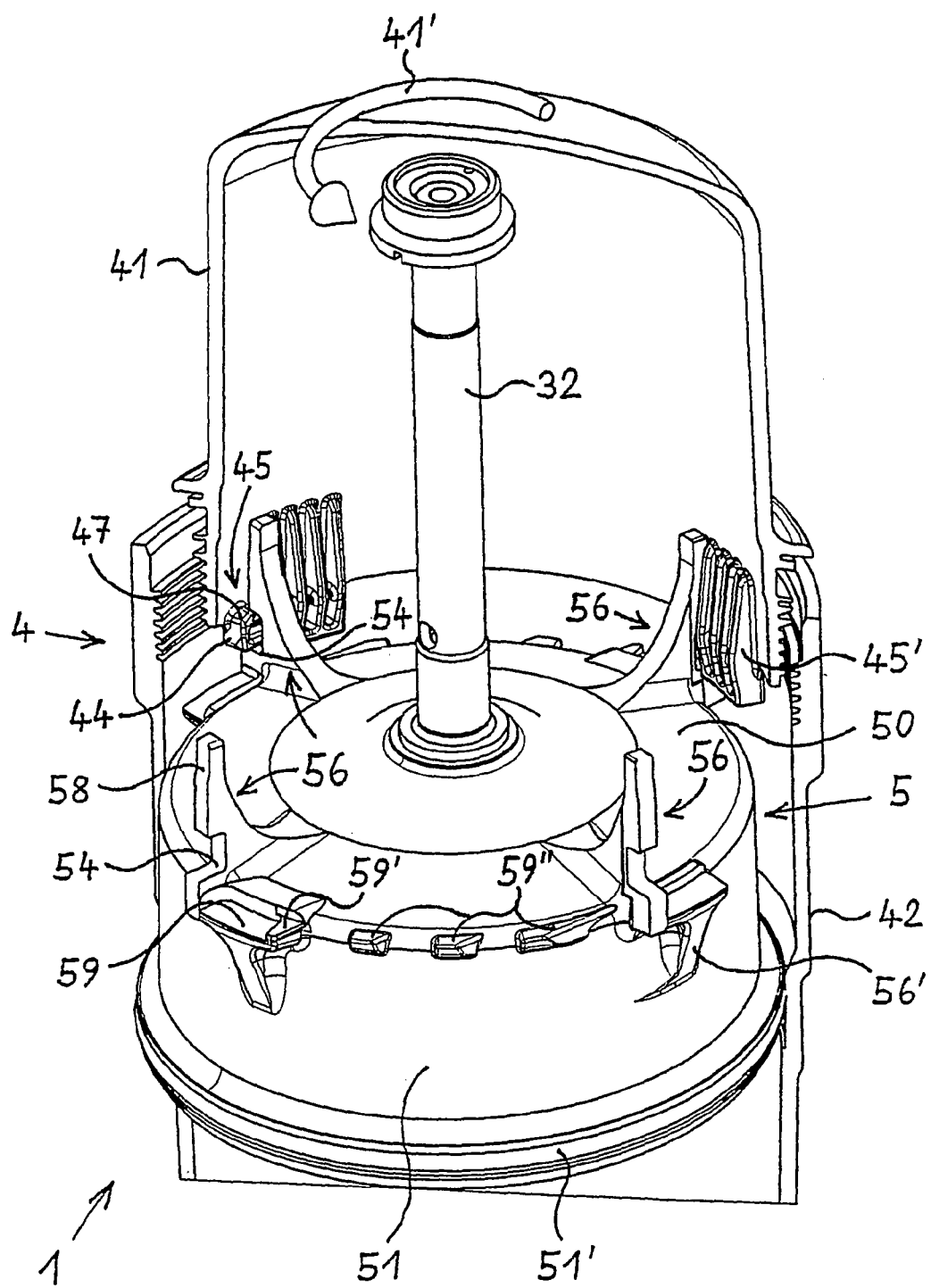
FIG. 4 is a view of the device of FIG. 1 in a state where the screw is being rotated in its loosening rotational direction, in the same type of illustration as in FIG. 1.

In a type of illustration according to FIGS. 1 and 2, FIG. 4 of the drawing shows the device 1 after the screw cap 41 has been rotated in its loosening rotational direction 41' for a few turns. This rotation of the screw cap 41 causes the hooks 44 of the connection means 45 at the screw cap 41 to engage the connection means 54 at the intermediate cap. Since the screw cap 41 is shown in a broken view in FIG. 4, two of the four connection means 45 of said screw cap 41 cannot be seen, but are in the same connection engagement with the further connection means 54 of the intermediate cap 5 as the visible connection means 45.

Starting from the tightened state of the screw cap 41, only the screw cap 41 is moved while it is rotated in its loosening rotational direction 41' for its first quarter turn; a rotation of the intermediate cap 5 has not been effected up to that point yet. While the screw cap 41 is rotated further in its loosening rotational direction 41', the hooks 44 enter into the apertures in the wings 56, said apertures forming the connection means 54, thus establishing an engagement. This remains unchanged while the screw cap 41 is rotated further in its loosening rotational direction 41'. While it is rotated still further, the screw cap 41 detaches from the stationary part 42 of the housing 4. Owing to the engagement of the connection means 45, 54 between the screw cap 41 and the intermediate cap 5, the screw cap 41 takes the centrifuge 3 and the intermediate cap 5 along in an upward direction. Therein, the intermediate cap 5 can be pulled out of the stationary housing part 42 without any difficulties, even against a vacuum.

In order to prevent the engagement from disengaging too easily and, thus, in a self-acting and undesired manner, the hooks 44 of the connection means 45 are each provided with a step 47 pointing in an upward direction. This step 47 ensures that the engagement is prevented from disengaging when a tractive force is exerted in axial direction. The engagement can only be disengaged by an intentional rotary motion.

After the assembly unit comprising screw cap 41, centrifuge 3 and intermediate cap 5 has been pulled out of the housing part 42, the filter element 2 can, thereafter and if necessary, be separately and easily pulled out of the housing part 42 in an upward direction.

The intermediate cap 5 can simply be separated from the screw cap 41 by briefly rotating these two parts in relation to each other in a rotational direction opposing the previous one, with the result that the connection means 45, 54 are brought out of engagement. In this manner, the screw cap 41 can initially be removed from the intermediate cap 5 in axial direction. Thereby, the centrifuge 3 will become accessible for a replacement of the centrifuge rotor 31, if need be.

The various parts of the device 1 can be assembled in reverse order and opposite rotational direction, in order to install first the filter element 2 in the housing part 42 and then form a pre-assembled unit comprising screw cap 41, centrifuge 3 and intermediate cap 5, which can then be jointly connected to the housing part 42.

In order to avoid difficulties when the upper end of the rotor axle 32 is introduced in the related recess in the screw cap 41, each wing 56 is, at its radially outer end, provided with a guide contour 58 that is extending in axial direction and fits in the interior region of the lower part of the screw cap 41 with a little motional play. This guide contour 58 ensures that there will be no cantings when the intermediate cap 5 and the screw cap 41, with the centrifuge 3 arranged therebetween, are joined together. On the contrary, the joining together is inevitably effected at an exactly axial orientation, this being ensured by the guide contour 58. At the same time, this ensures that the upper end of the rotor axle 32 always accurately enters in the associated recess on the inner side of the screw cap 41.

Alternatively, the filter element 2, the intermediate cap 5 and the centrifuge 3 can also be inserted separately in the housing part 42 one after the other; then the screw cap 41 can be screwed to the housing part 42.

Figure 5:
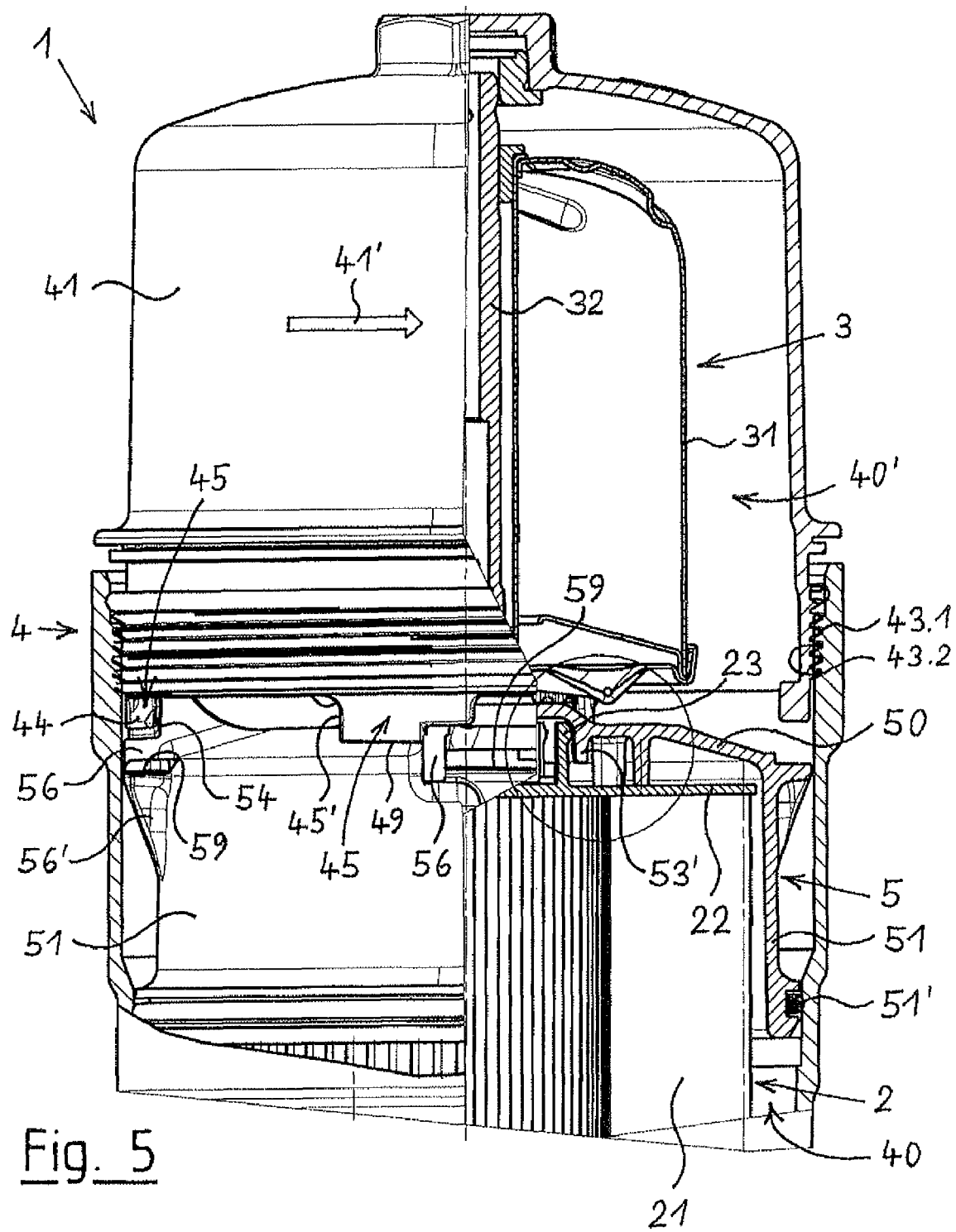
FIG. 5 is a view of the device in its state according to FIG. 4, in the same type of illustration as in FIG. 3.

FIG. 5 shows the device 1 with the screw cap 41 in the rotational state that has already been shown in FIG. 4, in the same type of illustration as in FIG. 3. FIG. 5 illustrates that the screw cap 41 has now been rotated in its loosening rotational direction 41' by a few turns, as compared with the position shown in FIG. 3. In this rotation, only the screw cap 41 is rotated for the first quarter turn, since its rotation has not been transmitted to the intermediate cap 5 yet.

While the screw cap 41 is rotated further beyond the first quarter turn, it takes the intermediate cap 5 along, because the hooks 44 are entering in the connection means 54 in loosening rotational direction. As a result, the intermediate cap 5 is also rotated while the screw cap 41 is further rotated in its loosening rotational direction and, owing to the engagement of the connection means 45, 54, also moves in an upward direction. Owing to the rotational freedom of the centering means 23, 53', the intermediate cap 5 can, therein, rotate freely in relation to the filter element 2 and move away from the filter element 2 in an upward direction.

Figure 6:
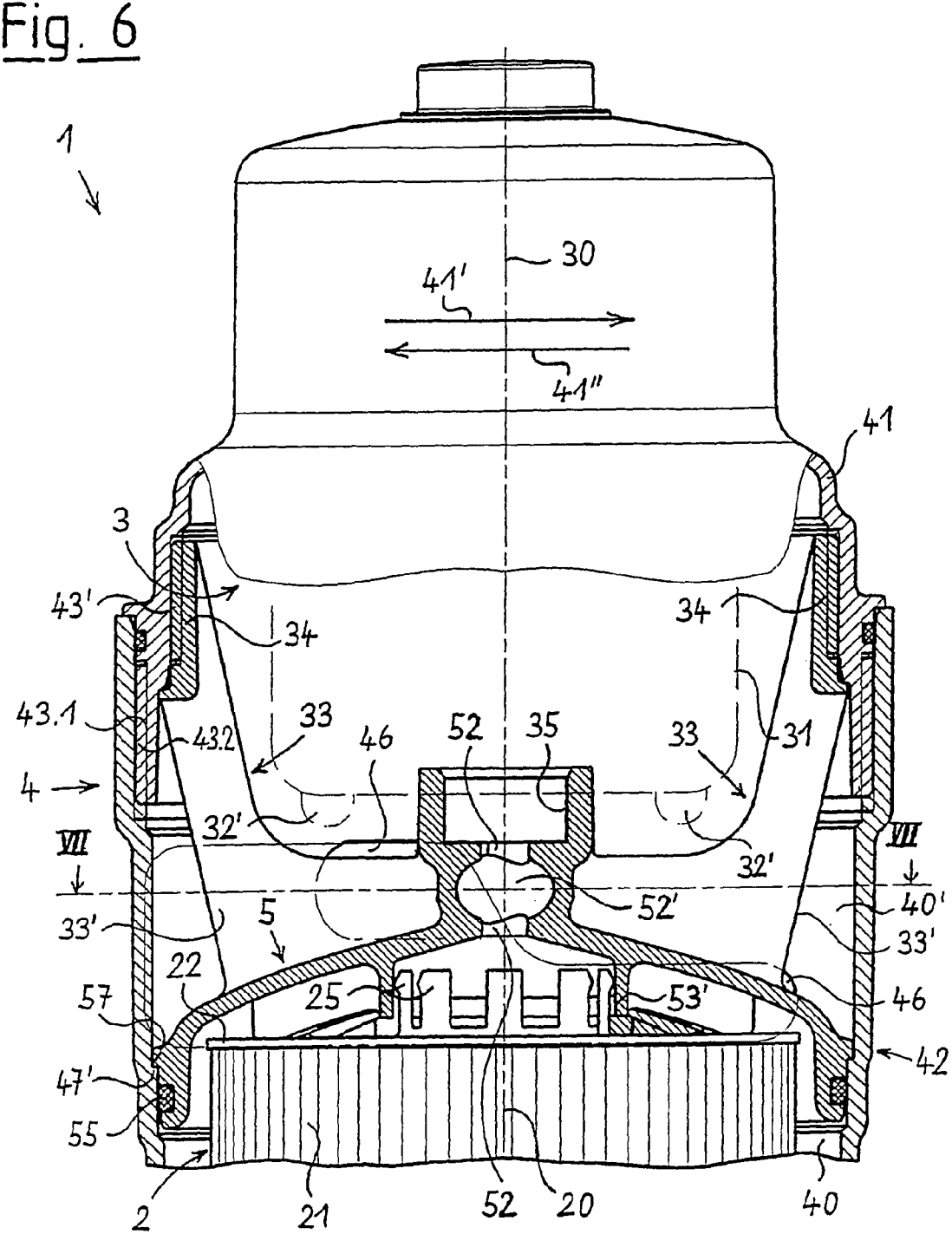
FIG. 6 is a longitudinal view of the device in a second executive form, partially in perspective.

FIG. 6 of the drawing shows a second executive form of a device 1 for separating impurities from the lubricating oil of an internal combustion engine. In its lower region, the device 1 comprises, as essential parts, a filter element 2 and, in its upper part, a centrifuge 3. Only the upper end region can be seen of the filter element 2. Said filter element 2 and said centrifuge 3 are arranged, one above the other, in a common housing 4 that comprises a screw cap 41 and a stationary lower housing part 42. At its upper end, the lower housing part 42 is provided with an internal thread; at its lower end, the screw cap 41 is provided with an external thread 43.1. As shown in FIG. 6, the screw cap 41 and the lower housing part 42 are screwed to each other in a sealing manner by means of these two threads 43.1 and 43.2. The screw cap 41 can be unscrewed from the lower housing part 42 for maintenance purposes, in particular for replacing the filter element 2 and/or a rotor 31 of the centrifuge 3. When in use, the device 1 is connected to an internal combustion engine, particularly to its engine block, by means of the lower housing part 42 in a manner that is not shown here.

In addition to the rotor 31, the centrifuge accommodated in the screw cap 41 of the housing 4 comprises a centrifuge bottom 33 which is designed with a plurality of flat arms 33' in the shape of a star. At its upper outer region, the centrifuge bottom 33 is provided with an annular end element with an external thread 34 which is screwed into a suitable mating internal thread 43' at the inner perimeter of the screw cap 41. The centrifuge bottom 33 can be prevented from rotating out of the screw cap 41, thus coming loose unintentionally, by a separate anti-loosening device (compare FIGS. 10 and 11) that is detachable if necessary.

A bearing holding 35 for a lower pivot bearing (not shown) of the centrifuge rotor 31 is arranged in the center of the centrifuge bottom 33. A second upper pivot bearing of the centrifuge rotor 31 is arranged at the top in the center of the screw cap 41 and is covered by same.

Owing to the fact that the centrifuge bottom 33 is screwed into the screw cap 41, the position of the bearing holding 35 and, thus, the position of the rotary axis 30 of the centrifuge rotor 31 is defined merely by the tolerance of the threaded connections to the threads 34 and 43'. Hereby, it is ensured that the bearing holding 35 and, thus, the lower bearing of the centrifuge rotor 31 is positioned with high precision, so that said centrifuge rotor 31 is mounted with very low friction.

The filter element 2 is arranged in the lower housing part 42. An intermediate cap 5 that separates a lower space 40 of the housing 4, which accommodates the filter element 2, from an upper space 40' of the filter housing 4 for the centrifuge 3 is arranged above the filter element 2. In the exemplary embodiment of the device 1 shown in FIG. 6, the centrifuge bottom 33 and the intermediate cap 5 are comprised to form a one-piece component. At its outer perimeter, the intermediate cap 5 is provided with a radially acting seal 55 ensuring that the lower space 40 is separated from the upper space 40' of the housing in the desired lubricating-oil-tight manner. Above the radially acting seal 55, the intermediate cap 5 is, with its outer perimeter and via a projection 57 projecting in a radially outward direction, supported on a step 47' that points in upward direction and is provided at the inner perimeter of the lower housing part 42, with the result that the position of the intermediate cap 5 is fixed in axial direction.

In the illustrated instance, the intermediate cap 5 possesses at its bottom side a centering ring 53' that cooperates with an appropriately arranged circle 25 of arms projecting from an upper end disk 22 of the filter element 2 in an upward direction. As a result, the filter element 2 is centered in relation to the intermediate cap 5; here, axial tractive forces are not transmitted by the centering means 25 and 53'.

As usual, the filter element 2 consists of a filter medium body 21 that is concertina-folded and bent to form a hollow cylinder, said filter medium body 21 being covered with one end disk 22 both at its top and its bottom.

Here, the axial direction 20 of the filter element 2 extends flush with the axial direction 30 of the centrifuge 3.

A through opening 52 in the center of the intermediate cap 5 serves to supply lubricating oil to the rotor 31 of the centrifuge 3. Pressurized lubricating oil flows through said through opening 52 and to the inlet (not shown) of the centrifuge rotor 31. The lubricating oil flows through two or more propulsion nozzles 32' and out of the centrifuge rotor 31, causing said centrifuge rotor 31 to rotate about its axis 30. The lubricating oil exiting out of the propulsion nozzles 32' flows, pressureless and by virtue of gravity, between the arms 33' of the centrifuge bottom 33 in downward direction and is supplied through an outlet duct 46, that is, here, visible to a small part only, and, for example, to the oil pan of the associated internal combustion engine. To ensure that the internal combustion engine is permanently supplied with lubricating oil, with priority over oil purification through the centrifuge 3, a valve enabling oil to be supplied to the centrifuge 3 only after a defined minimum lubricating oil pressure has been exceeded in the region of the filter element 2 can be arranged in a recess 52' extending in transverse direction in relation to the through opening 52.

Figure 7:
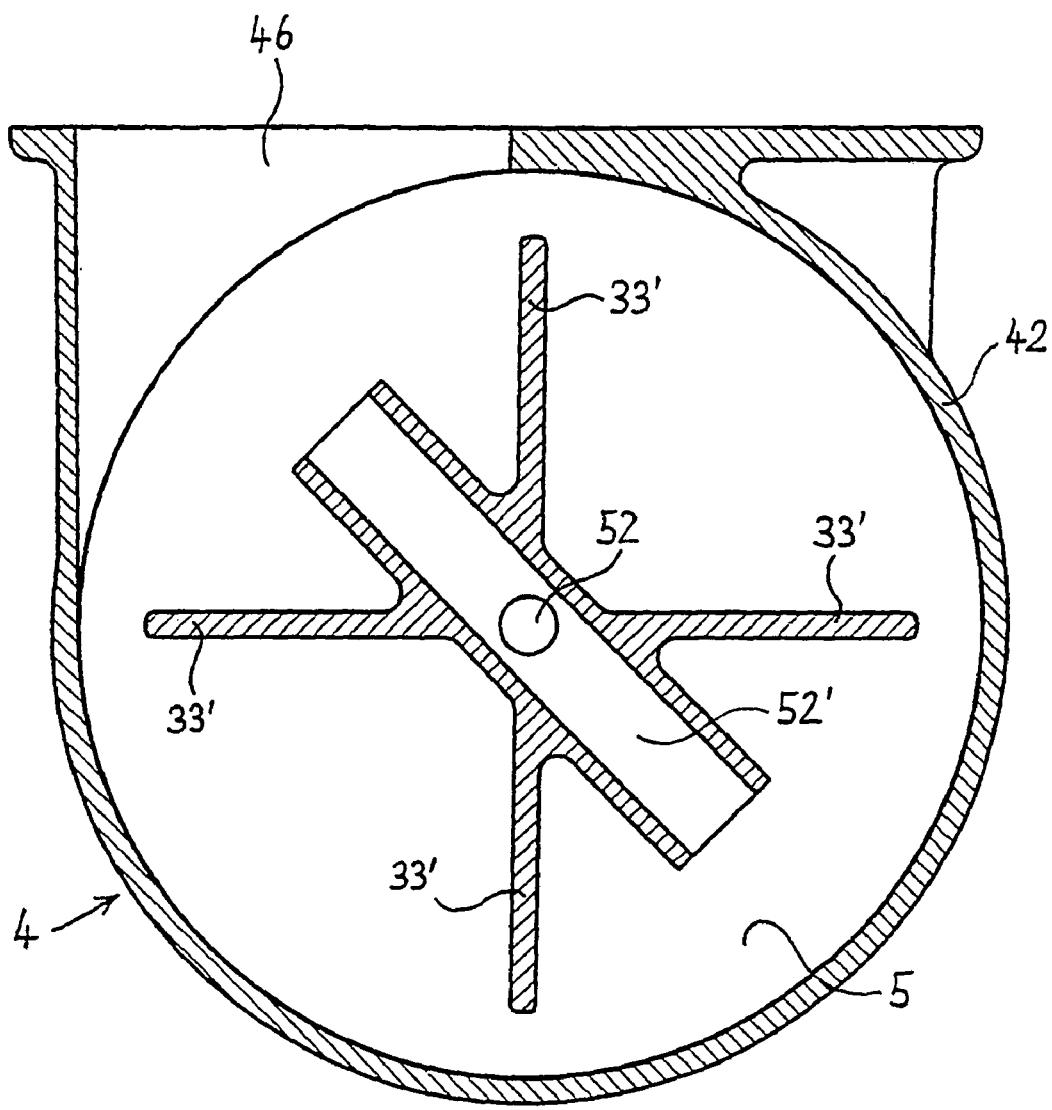
FIG. 7 is a cross-sectional view of the device of FIG. 6, taken from line VII-VII in FIG. 6.

FIG. 7 of the drawing is a cross-sectional view of the device 1 shown in FIG. 6, taken from line VII-VII in FIG. 6. Herein, FIG. 7 particularly illustrates that the housing 4 of the device 1 essentially comprises a circular cross-section. A part of the lubricating-oil outlet duct 46 which is, for example, running to the oil pan of the internal combustion engine can be seen to the upper left of FIG. 7.

The through opening 52 can be seen in the center of FIG. 7. The recess 52' that has the shape of a hollow cylinder and serves to hold the aforementioned valve enabling the supply of lubricating oil to the centrifuge 3 only after a defined minimum lubricating oil pressure has been exceeded extends in transverse direction in relation to this through opening 52. To the left, to the right, in upward direction and in downward direction, the arms 33' of the centrifuge bottom 33 extend from within outward in radial direction. Here, it becomes clearly visible that the flow cross-section available for the lubricating oil that flows out pressureless after having exited out of the rotor 31 of the centrifuge 3 is very large, so that it is ensured that the lubricating oil can flow out rapidly, solely by virtue of gravity.

In the background, the intermediate cap 5 is positioned inside the lower housing part 42.

Figure 8:
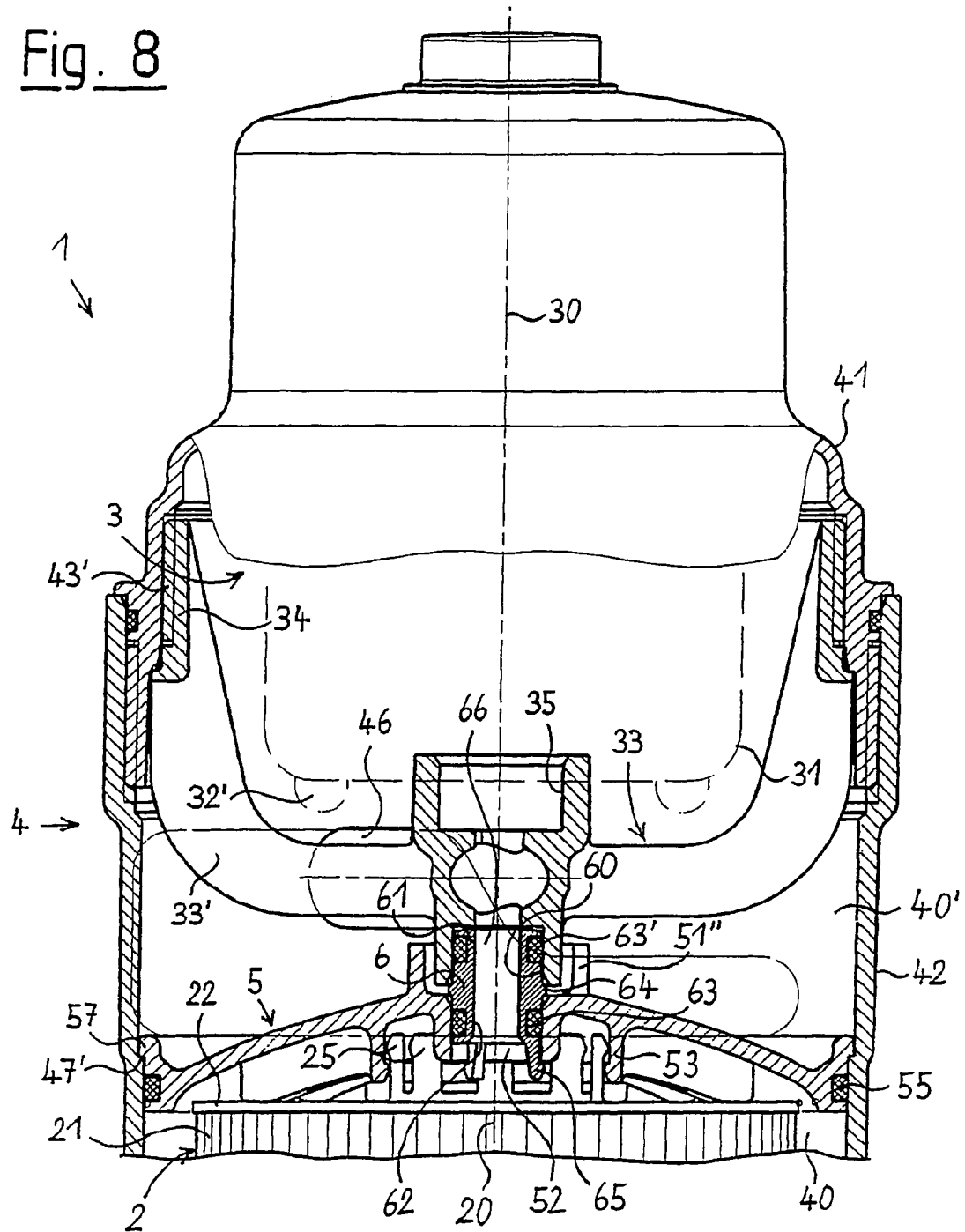
FIG. 8 is a view of the device in a third executive form, in the same type of illustration as in FIG. 6.

The device 1 in the executive form according to FIG. 8 also serves to separate impurities from the lubricating oil of an internal combustion engine. As essential parts, this device 1 also comprises in its lower region a filter element 2 and in its upper region a centrifuge 3. Only the upper end region is shown of the filter element 2. Here as well, the filter element 2 and the centrifuge 3 are arranged, one above the other, in a common housing 4, wherein said housing 4 comprises a screw cap 41 at its top and a stationary housing part 42 at its bottom. As has already been described above, the screw cap 41 and the housing part 42 are screwed to each other in a sealing manner, each by means of a screw thread. For maintenance purposes, the screw cap 41 can be unscrewed from the lower housing part 42 that is connected to an associated internal combustion engine not shown here.

Here as well, an intermediate cap 5 that is plugged in the lower housing part 42 is arranged above the filter element 2 inside the housing 4. In contrast to the device according to FIGS. 6 and 7, the intermediate cap 5 in the illustrated instance possesses at its bottom side a locking collar 53 that is projecting in downward direction and is in engagement with the locking arms 25 of an upper end disk 22 of the filter element 2, said locking arms 25 projecting in upward direction. Owing to the additional engagement of these locking connection means 25 and 53 between the intermediate cap 5 and the filter element 2, the screw cap 41, when being rotated in its loosening rotational direction, takes not only the centrifuge 3, the centrifuge bottom 33 and the intermediate cap 5 along in an upward direction, but also the filter element 2. After this assembly unit has been pulled out of the housing part 42, the filter element 2 can be separated from the intermediate cap 5 simply by disconnecting the connection means 23, 53; thereafter, the filter element 2 can be pulled out of the intermediate cap 5 in an axially downward direction.

At its bottom side, the upper end disk 22 is impermeably connected to a filter medium body 21 in the manner known.

In its center, the intermediate cap 5 possesses a through opening 52 serving as an oil duct for supplying oil from the lower space 40 of the housing 4 in an upward direction to the centrifuge 3.

In the illustrated instance, an adapter piece 6 that forms a hollow duct 66 in axial direction is inserted in the aperture 52, said hollow duct 66 representing a continuation of the oil duct 52. Along about half of its height, the adapter piece 6 is, with its lower part 62, seated in the intermediate cap 5 and is located in the latter's central through opening 53. A plurality of flexible locking arms 65 projecting from the bottom side of the adapter piece 6 in a downward direction and comprising locking noses extending in outward direction are provided to locate the adapter piece 6. With the locking arms 65 in front, the adapter piece 6 can be inserted in the central through opening 53 of the intermediate cap 5 from above, then engaging therein after the locking arms 65 have stopped yielding elastically. Therein, a small collar 64 that is projecting in outward direction and is provided approximately centrally along the height of the adapter piece 6 serves as an insertion limit or stop.

A collar 51" designed as a part of the intermediate cap 5 extends around the adapter piece 6.

At its outer perimeter, the upper part 61 of the adapter piece 6 has a spherical contour, with the result that a centrifuge bottom 33 seated on the adapter piece 6 can be rotated in relation to the adapter piece 6 to a limited extent. This provides the possibility of rotating the central axis 30 of the centrifuge 3 in relation to the central axis 20 of the filter element 2 and the intermediate cap 5 for the purpose of compensating tolerances. Therein, a reliable axial coherence and the safe seal of the adapter piece 6 via its sealing rings 63, 63' remains preserved both against the intermediate cap 5 and against the centrifuge bottom 33.

As a supplement, the lower part 62 of the adapter piece 6 can, at its outer perimeter, also have a spherical contour, with the result that the adapter piece 6 then also becomes rotatable in relation to the intermediate cap 5, if this is required for compensating tolerances.

Starting from its central part seated on the adapter piece 6, the centrifuge bottom 33 has the form of a plurality of arms 33' extending in outward and upward direction, said arms 33' leaving between them adequately large flow cross-sections for lubricating oil flowing out of the centrifuge 3. An oil discharge duct 46 through which the lubricating oil purified in the centrifuge 3 flows out pressureless, for example to the oil pan of the associated internal combustion engine, can be seen above the intermediate cap 5 in the right-hand section in the interior region of the housing 4.

Here as well, the centrifuge 3 has a design that is known as such, comprising a centrifuge rotor 31 with two propulsion nozzles 32' provided at its bottom. The lubricating oil is supplied to the centrifuge 3 through the central through opening 52 and the hollow interior region 66 of the adapter piece 6 into the interior region of the centrifuge rotor 31. The lower bearing of the centrifuge rotor 31, which is not shown here, is mounted in a bearing holding 35 forming part of the centrifuge bottom 33 and positioned above the adapter piece 6 spaced apart therefrom.

The screw cap 41 also forms the outer part of the centrifuge 3. To be able to remove the centrifuge rotor 31 from the centrifuge 3 for maintenance purposes, the screw cap 41 of the housing 4 is initially unscrewed from the latter's lower part 42. Therein, the centrifuge bottom 33 which is screwed into an internal thread 43' in the screw cap 41 via an external thread 34 is also moved out of the lower housing part 42. Therein, an axial tractive force is transmitted via the adapter piece 6 to an adequate extent, so that the intermediate cap 5 and the filter element 2 engaged therewith are also pulled out while the screw cap 41 is unscrewed from the lower housing part 42. The filter element 2 will then be accessible directly; after the centrifuge bottom 33 has been unscrewed from the screw cap 41, the centrifuge rotor 31, if used up, can also be replaced.

Figure 9:
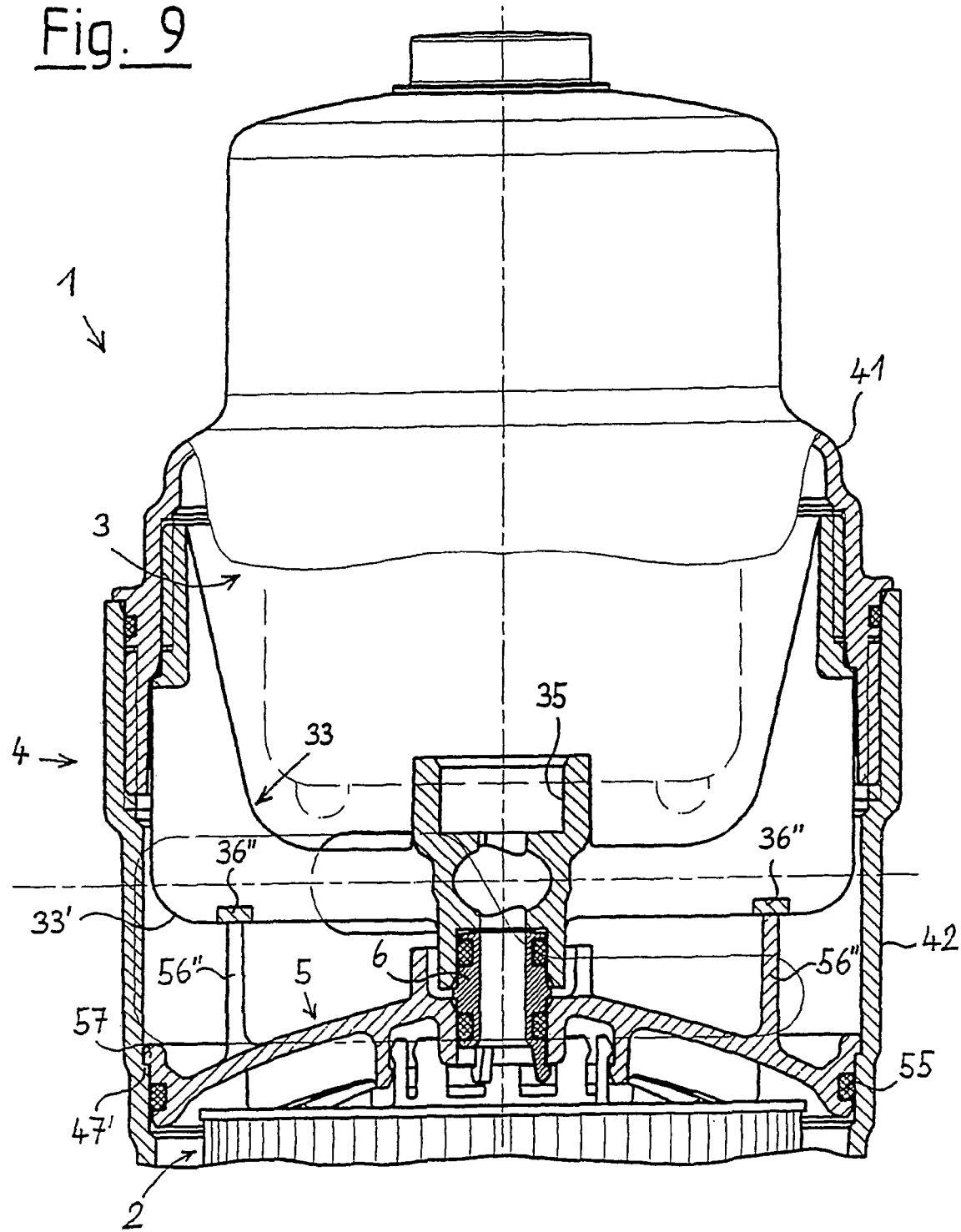
FIG. 9 is a view of the device in a forth executive form, in the same type of illustration as in FIG. 6.

The exemplary embodiment of the device 1 according to FIG. 9 is largely identical with the device 1 according to FIG. 8. The intermediate cap 5 is inserted in the lower housing part 42 in the device 1 according to FIG. 9 as well. Here as well, the seal is achieved by means of a circumferential sealing ring 55 at the outer perimeter of the intermediate cap 5. In order to lock the intermediate cap 5 in its position in a particularly reliable manner when the housing 4 is in its closed state, the intermediate cap 5 is, here, provided at its upper side with a circle of supporting webs 56" that are projecting in an upward direction. A circumferential supporting ring 36" the bottom side of which bears against the upper edge of the supporting webs 56" with the device 1 in its assembled state is provided at the centrifuge bottom 33 at an appropriate opposite position. As a result, the intermediate cap 5 cannot leave its provided position any longer.

As regards the further component parts shown in FIG. 9, reference is made to the description of FIG. 8.

Figure 10:
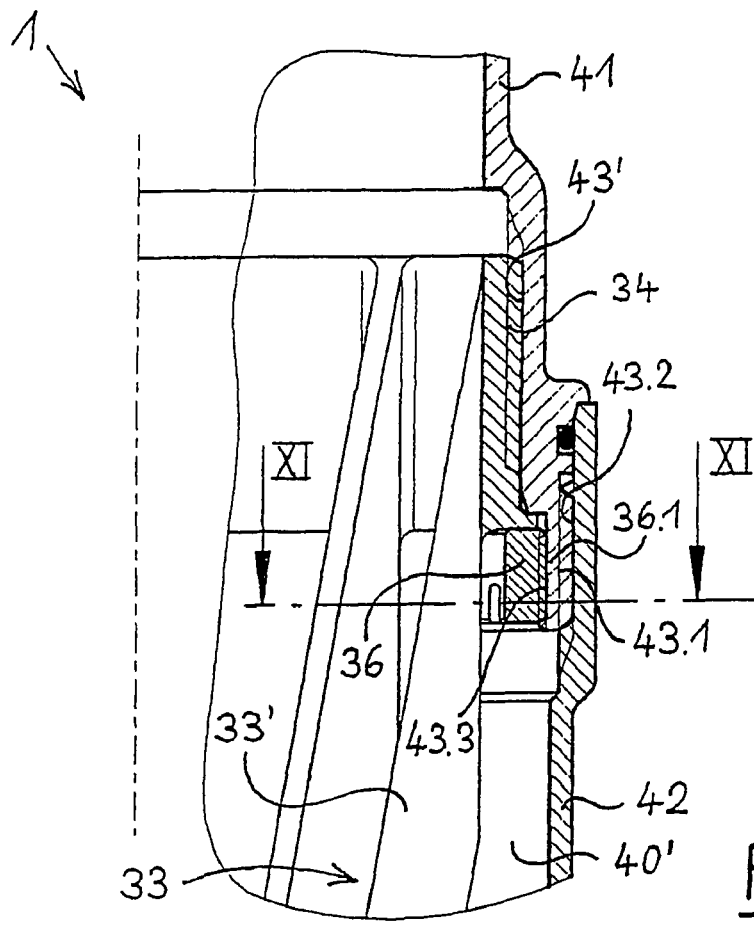
FIG. 10 is a partially longitudinal view of the device in a fifth executive form.

FIG. 10 of the drawing is a partial longitudinal view of a fifth executive form of the device 1, which essentially corresponds to the devices 1 according to FIGS. 6 to 9. In addition, the executive form of the device 1 according to FIG. 10 provides means for securing the screwed connection between the centrifuge bottom 33 and the screw cap 41.

As has already been illustrated above, the centrifuge bottom 33 that comprises a plurality of arms 33' possesses in its upper end region a circumferential annular part which is provided with an external thread 34. By means of this external thread 34, the centrifuge bottom 33 is screwed into a suitable mating internal thread 43' in the screw cap 41. In order to ensure that this screwed connection 34, 43' cannot come loose unintentionally, a lock ring 36 is, here, provided as detachable anti-loosening device.

At its outer perimeter, the lock ring 36 is provided with an external thread 36.1. Below the internal thread 43', a second internal thread 43.3, which has a larger diameter and matches the thread 36.1 and into which the lock ring 36 is screwed in from below after the centrifuge bottom 33 has been screwed to the screw cap 41 beforehand, is provided in the screw cap 41. The lock ring 36 ensures that, during operation of the device 1 and while the screw cap 41 is rotated in its loosening rotational direction or in its tightening rotational direction, the screwed connection 34, 43' between the centrifuge bottom 33 and the screw cap 41 always remains protected against unintentional loosening. The lock ring 36 can only be loosened with the screw cap 41 unscrewed; thereafter, the centrifuge bottom 33 can be screwed out of the screw cap 41.

Figure 11:
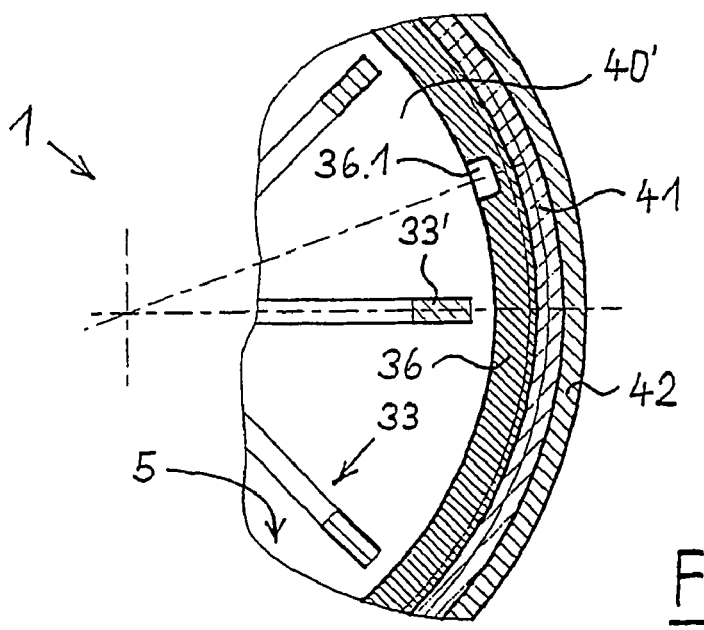
FIG. 11 is a partially cross-sectional view of the device of FIG. 10, taken from sectional line XI-XI in FIG. 10.

Finally, FIG. 11 is a partial cross-sectional view of the device 1 shown in FIG. 10, taken along sectional line XI-XI. To the outer right, the lower stationary housing part 42 of the device 1 is the first to be cut in radial direction, as seen from without inward. This is followed by the screw cap 41 and finally, still further inward in radial direction, by the lock ring 36, wherein the three parts mentioned are screwed to each other, as has been illustrated above in connection with FIG. 10.

At its inner perimeter, the lock ring 36 possesses at least two recesses 36.1 that are open in a radially inward direction and in an axially downward direction, said recesses 36.1 serving to apply and engage a screwing tool for tightening and loosening the lock ring 36. The lock ring 36 can be used for all devices 1 according to FIGS. 6 to 9.

FIG. 11 shows a few arms 33' of the centrifuge bottom 33 in the interior region 40' of the screw cap 41 and the housing part 42. In the background of FIG. 11, the intermediate cap 5 is positioned in the interior region 40' of the housing part 42.

As is apparent from the foregoing specification, the invention is susceptible of being embodied with various alterations and modifications which may differ particularly from those that have been described in the preceding specification and description. It should be understood that 1 wish to embody within the scope of the patent warranted hereon all such modifications as reasonably and properly come within the scope of my contribution to the art.

The invention claimed is:

1. A device for separating impurities from the lubricating oil of an internal combustion engine, said device comprising a filter element at its bottom and, on top of said filter element, a centrifuge with a rotor drivable by means of lubricating oil flowing therethrough, wherein said filter element and said centrifuge are arranged, one above the other, in a common two-piece housing that is closed during operation of the device and comprises a removable upper screw cap and a stationary lower housing part, wherein a removable intermediate cap is arranged in the housing between said filter element and said centrifuge, and wherein said centrifuge, said intermediate cap and said filter element can be removed from the housing while the latter is in its open state, wherein only the screw cap and the intermediate cap comprise detachable connection members that can be brought in engagement with each other and are arranged to transmit at least one of axial tractive forces and axial tractive and compressive forces between each other, and relative to each other, the intermediate cap and the filter element are unconnected component parts of the device, and the intermediate cap and the filter element are constructed free of connection elements that would transmit tractive forces between the intermediate cap and the filter element.

2. A device according to claim 1, wherein by rotating the screw cap in its loosening rotational direction in relation to the intermediate cap, the connection members are brought in engagement with each other and, by rotating the screw cap in its tightening rotational direction in relation to the intermediate cap, the connection members are brought out of engagement with each other.

3. A device according to claim 2, wherein the intermediate cap has the shape of a bell and comprises at its outer perimeter axially extending ribs, each of which is provided with at least one of a broadening and aperture pointing in circumferential direction and is designed as a first of the connection members and the screw cap comprises at its lower edge hooks or noses that are pointing in a loosening rotational direction and are provided as a second of the connection members and can be brought in engagement with the first connection member by rotating the screw cap in its loosening rotational direction in relation to the intermediate cap and can be brought out of engagement by rotating the screw cap in its tightening rotational direction in relation to the intermediate cap.

4. A device according to claim 3, wherein the ribs that comprise the first connection member also comprise stabilization and force diverting ribs for reinforcing the intermediate cap and for diverting onto the screw cap such forces that are caused by an oil pressure below the intermediate cap in the interior region of the housing.

5. A device according to claim 3, wherein one of the first of the connections members on the one hand and the second of the connection members on the other hand are formed to have one of a slope or step at their surfaces engaging each other, said slope or step securing the engaged position.

6. A device according to claim 2, wherein the intermediate cap has the shape of a bell and, in a radially outward direction, comprises at its upper side a plurality of axially extending wings that are pointing in upward direction and are spaced apart from each other in circumferential direction, wherein each of said wings is formed to have as connection means at least one of a broadening or aperture pointing in a circumferential direction and one recess pointing in a radially inward direction and that, at its lower edge, the screw cap comprises as connection means hooks or noses extending in one of its loosening rotational direction and in a radially inward direction, wherein said hooks or noses are arranged such that they will be brought in engagement with the connection means of the intermediate cap by rotating the screw cap in its loosening rotational direction in relation to the intermediate cap and is arranged such that they will be brought out of engagement with the connection means of the intermediate cap by rotating the screw cap in its tightening rotational direction in relation to the intermediate cap.

7. A device according to claim 6, wherein the connection member of the screw cap on the one hand and the wings with the connection member of the intermediate cap on the other hand are arranged and designed such that, with the intermediate cap being already inserted in the housing, they overlap each other in axial direction when the screw cap is placed onto the stationary housing part before the thread engagement thereof.

8. A device according to claim 6, wherein the wings are, at their radially outer end, provided with a guide contour that fits in the interior region of the screw cap with a motional play.

9. A device according to claim 6, wherein a step is provided at or next to each of the wings, said step projecting in a radially outward direction and forming the basis on which a section of the lower edge of the screw cap is supported when the latter is in the tightened state.

10. A device according to claim 9, wherein each of the steps, at least in part, comprise an edge projecting in an upward direction at its end pointing in the loosening rotational direction of the screw cap.

11. A device according to claim 10, wherein one of a continuous and broken sliding ramp is provided for the lower edge of the screw cap, said sliding ramp being arranged at the level of said edge and, as seen in the tightening rotational direction of the screw cap, in front of each of the steps at the intermediate cap that comprise at least one edge.

12. A device according to claim 6, wherein the wings are one of connected to each other via a continuous circumferential collar and are joined to form a continuous circumferential collar.

13. A device according to claim 1, wherein the connection members connecting the screw cap and the intermediate cap that are formed as rotary connection means are in the form of one of a bayonet lock and a short-length thread.

14. A device according to claim 1, wherein the screw cap is formed to have strengthening ribs at its inner perimeter, at least in the region of its connection member.

15. A device according to claim 1, wherein at least one of the screw cap and the intermediate cap are formed as single-piece injection-molded plastic parts.

16. A device according to claim 1, wherein at least one of the screw cap and the intermediate cap are each single-piece die light metal castings.

17. A device for separating impurities from the lubricating oil of an internal combustion engine, said device comprising a filter element at its bottom and, on top of said filter element, a centrifuge with a rotor drivable by means of lubricating oil flowing therethrough, wherein said filter element and said centrifuge are arranged, one above the other, in a common two-piece housing that is closed during operation of the device and comprises a removable upper screw cap and a stationary lower housing part, wherein a removable intermediate cap is arranged in the housing between said filter element and said centrifuge, and wherein said centrifuge, said intermediate cap and said filter element can be removed from the housing while the latter is in its open state, wherein only the screw cap and the intermediate cap comprise detachable connection members that can be brought in engagement with each other and are arranged to transmit at least one of axial tractive forces and axial tractive and compressive forces between each other, and relative to each other, the intermediate cap and the filter element are unconnected component parts of the device, the device being provided with a perforated centrifuge bottom that forms a part of the intermediate cap and permits lubricating oil coming out of the rotor to flow therethrough, the centrifuge bottom comprising in its center a holding for one of a lower pivot bearing and a lower axle end of the rotor, and the centrifuge bottom being provided at its outer perimeter and at least in its upper part with an annular external thread that is arranged to be screwed into a mating internal thread in the interior region of the screw cap.

18. A device according to claim 17, wherein the centrifuge bottom and the intermediate cap are formed integrally with each other.

19. A device according to claim 17, wherein the centrifuge bottom and the intermediate cap are each formed as a separate component which are brought in at least one of an axially extending sealing plug and screwed connection which transmits at least one of axial tractive forces and axial tractive and compressive forces.

20. A device according to claim 19, wherein an adapter piece that is hollow in its axial direction is inserted between the centrifuge bottom and the intermediate cap, the lower part of said adapter piece centrally engaging the intermediate cap and the upper part of said adapter piece centrally engaging the centrifuge bottom, wherein the outer perimeter of the adapter piece has a spherical contour in one of its upper and lower parts, permitting rotation of the adapter piece in relation to the axial direction to a limited extent.

21. A device according to claim 20, wherein the adapter piece comprises in its lower part a plurality of axially extending flexible locking arms with locking noses which permit engaging insertion of the adapter piece in an oil through opening in the intermediate cap.

22. A device according to claim 19, wherein the adapter piece comprises at its outer perimeter one of a projecting band and collar between its lower part and its upper part.

23. A device according to claim 17, wherein, to permit connection of the screw cap and the lower housing part to each other in a detachable manner, the screw cap is designed with one of an external thread and an internal thread and the lower housing part with the other of a mating internal thread and a mating external thread.

24. A device according to anyone of claim 17, wherein the centrifuge bottom comprises a plurality of arms that extend in a radial direction from the holding to its outer perimeter comprising the external thread and which are spaced apart from each other in circumferential direction.

25. A device according to claim 24, wherein the arms are flat, with their flat planes each being arranged in a radial and an axial direction.

26. A device according to claim 17, wherein the intermediate cap is plugged in the lower part of the housing with an intermediate layer of one of a radially and axially acting seal being placed therebetween.

27. A device according to claim 17, wherein, with the housing closed, the intermediate cap is, at its outer perimeter, supported in an axial direction on the upper side of a step in the inner perimeter of the lower housing part.

28. A device according to claim 17, wherein the centrifuge, the centrifuge bottom, the intermediate cap and the screw cap form a pre-assembled unit which can be screwed to the lower housing part.

29. A device according to claim 17, wherein the screwed connection between the screw cap and the stationary housing part and the screwed connection between the screw cap and the centrifuge bottom comprise equidirectional threads.

30. A device according to claim 29, wherein the screwed connection between the screw cap and the centrifuge bottom has a loosening torque that exceeds the loosening torque of the screwed connection between the screw cap and the stationary housing part.

31. A device according to claim 29, wherein the screwed connection between the screw cap and the centrifuge bottom has a loosening torque that exceeds the loosening torque between the intermediate cap and the stationary housing part.

32. A device according to claim 17, wherein the screwed connection between the screw cap and the stationary housing part and the screwed connection between the screw cap and the centrifuge bottom comprise threads of opposite sense.

33. A device according to claim 17, wherein a detachable anti-loosening device is provided at least for the screwed connection between the screw cap and the centrifuge bottom.

34. A device according to claim 17, wherein the intermediate cap and the filter element, as seen in relation to each other, are non-connected component parts of the device without any connection means.

35. A device according to claim 17, wherein the intermediate cap and the filter element comprise detachable second connection members arranged to transmit axial tractive forces and to be brought in engagement with each other.

36. A device according to claim 35, wherein the second connection member comprises an arrangement providing a locking connection.

37. A device according to claim 35, wherein the second connection member comprises an arrangement providing one of a screwed connection, a bayonet-type connection and a rotary connection.

38. A device according to claim 17, wherein the housing, the centrifuge bottom, the intermediate cap and the adapter piece are parts manufactured in an injection-molding process of one of plastic and light metal.

39. A device according to claim 17, wherein by rotating the screw cap in its loosening rotational direction in relation to the intermediate cap, the connection members are brought in engagement with each other and, by rotating the screw cap in its tightening rotational direction in relation to the intermediate cap, the connection members are brought out of engagement with each other.

40. A housing assembly for a device for separating impurities from the lubricating oil of an internal combustion engine which device includes a filter element at a bottom of said device and a centrifuge with a rotor drivable by means of lubricating oil flowing therethrough arranged on top of said filter element, comprising:

a common two-piece housing, arranged to receive said filter element and said centrifuge positioned one above the other, which is closed during operation of said device, said housing including a removable upper screw cap and a stationary lower housing part, and a removable intermediate cap arranged in said housing between said filter element and said centrifuge, said centrifuge, said intermediate cap and said filter element being removable from said housing while said housing is in an open state, and only said screw cap and said intermediate cap comprising detachable connection members engageable with each other and being arranged to transmit at least one of axial tractive forces and axial tractive and compressive forces between each other, relative to each other, said intermediate cap and said filter element being unconnected component parts of the device, and the intermediate cap and the filter element being constructed free of connection elements that would transmit tractive forces between the intermediate cap and the filter element.

* * * * *